United States Patent
Takeda et al.

(10) Patent No.: US 11,683,664 B2
(45) Date of Patent: Jun. 20, 2023

(54) FEEDBACK PROCESS IN MULTICAST RETRANSMISSION

(71) Applicant: QUALCOMM Incorporated, San Diego, CA (US)

(72) Inventors: Kazuki Takeda, Tokyo (JP); Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 17/219,469

(22) Filed: Mar. 31, 2021

(65) Prior Publication Data
US 2022/0322046 A1 Oct. 6, 2022

(51) Int. Cl.
*H04W 72/12* (2009.01)
*H04W 72/04* (2009.01)
*H04W 72/23* (2023.01)
*H04W 4/06* (2009.01)

(52) U.S. Cl.
CPC ........... *H04W 4/06* (2013.01); *H04W 72/042* (2013.01); *H04W 72/12* (2013.01)

(58) Field of Classification Search
CPC ...... H04W 72/042; H04W 72/12; H04W 4/06
USPC .......................................................... 370/312
See application file for complete search history.

(56) References Cited

U.S. PATENT DOCUMENTS

2013/0070660 A1* 3/2013 Xu ........................ H04W 4/06
370/312

* cited by examiner

*Primary Examiner* — Angel T Brockman
(74) *Attorney, Agent, or Firm* — Holland & Hart LLP

(57) ABSTRACT

Methods, systems, and devices for wireless communications are described. A base station may transmit a downlink control information (DCI) message to one or more user equipments (UEs) scheduling a multicast data message in a multicast downlink shared channel, the DCI message indicating a feedback process identifier (ID) for the multicast data message. The base station may transmit an additional DCI message to a UE scheduling a retransmission of the multicast data message in a unicast downlink shared channel and indicating a feedback process ID for the retransmission of the multicast data message. The feedback process ID for the retransmission may be the same as, or different from, the initial transmission of the multicast data message. The UE may transmit feedback for the multicast data message based on receiving the initial transmission of the multicast data or the retransmission of the multicast data and the feedback process IDs.

37 Claims, 20 Drawing Sheets

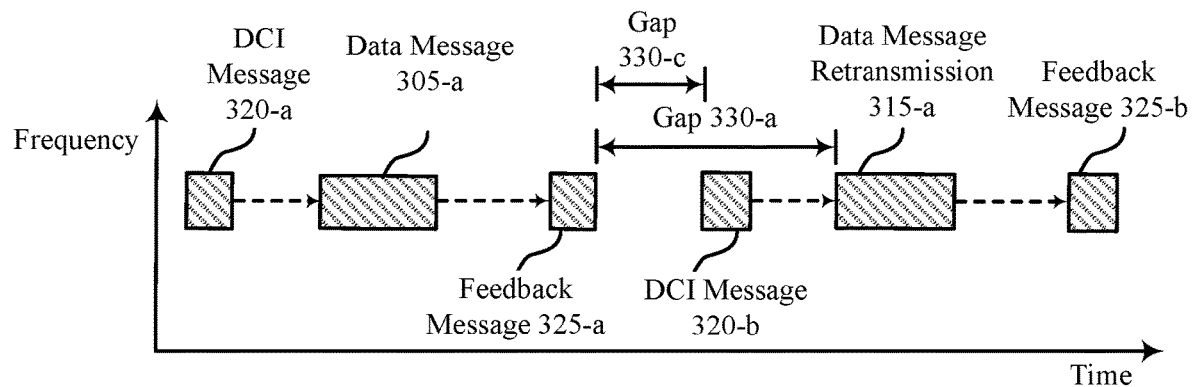
FIG. 3A
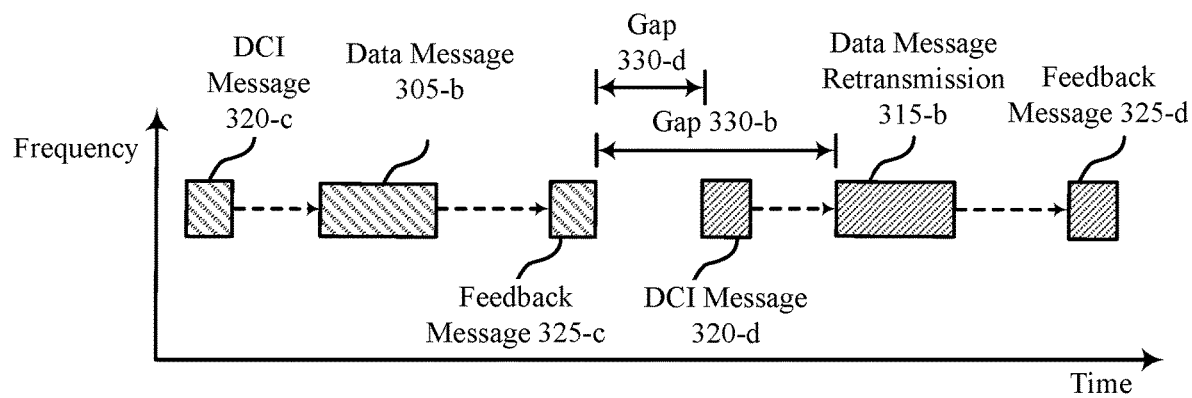
FIG. 3B
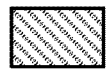 PTM Transmission Scheme 310
 PTP Transmission Scheme 335

FEEDBACK PROCESS IN MULTICAST RETRANSMISSION

FIELD OF TECHNOLOGY

The following relates to wireless communications, including a feedback process in multicast retransmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support a feedback process in multicast retransmission. Generally, the described techniques provide for a base station to transmit a downlink control information (DCI) message to one or more user equipments (UEs) scheduling a multicast data message in a multicast downlink shared channel. The DCI message may indicate a feedback process identifier (ID) for the multicast data message. The base station may attempt to send the multicast data message in the multicast downlink shared channel according to a point-to-multipoint (PTM) transmission scheme. The base station may transmit an additional DCI message to a UE scheduling a retransmission of the multicast data message and indicating a feedback process ID to use for the retransmission of the multicast data message. In some examples, the feedback process ID for the retransmission of the multicast data may be the same as for the initial transmission of the multicast data. In some other examples, the feedback process ID for the retransmission of the multicast data may be different from the initial transmission of the multicast data. In some cases, the base station may transmit the retransmission of the multicast data message in another multicast downlink shared channel according to the PTM transmission scheme. In some other cases, the base station may transmit the retransmission of the multicast data message in a unicast downlink shared channel according to a retransmission timing rule. The UE may transmit feedback for the multicast data message based on receiving at least one of the initial transmission of the multicast data or the retransmission of the multicast data and the feedback process IDs for each.

A method for wireless communications at a UE is described. The method may include receiving a first DCI message scheduling transmission of a multicast data message in a multicast downlink shared channel, the first DCI message also indicating a first feedback process ID associated with the multicast data message, receiving a second DCI message scheduling a unicast downlink shared channel that includes a retransmission of the multicast data message, the second DCI message also indicating a second feedback process ID associated with the unicast downlink shared channel and that is different from the first feedback process ID, receiving an indication that the second feedback process ID is associated with the first feedback process ID, and transmitting feedback pertaining to the multicast data message based on at least one of the multicast downlink shared channel or the unicast downlink shared channel and the second feedback process ID being associated with the first feedback process ID.

An apparatus for wireless communications is described. The apparatus may include a processor, memory coupled with the processor, and instructions stored in the memory. The instructions may be executable by the processor to cause the apparatus to receive a first DCI message scheduling transmission of a multicast data message in a multicast downlink shared channel, the first DCI message also indicating a first feedback process ID associated with the multicast data message, receive a second DCI message scheduling a unicast downlink shared channel that includes a retransmission of the multicast data message, the second DCI message also indicating a second feedback process ID associated with the unicast downlink shared channel and that is different from the first feedback process ID, receive an indication that the second feedback process ID is associated with the first feedback process ID, and transmit feedback pertaining to the multicast data message based on at least one of the multicast downlink shared channel or the unicast downlink shared channel and the second feedback process ID being associated with the first feedback process ID.

Another apparatus for wireless communications at a UE is described. The apparatus may include means for receiving a first DCI message scheduling transmission of a multicast data message in a multicast downlink shared channel, the first DCI message also indicating a first feedback process ID associated with the multicast data message, means for receiving a second DCI message scheduling a unicast downlink shared channel that includes a retransmission of the multicast data message, the second DCI message also indicating a second feedback process ID associated with the unicast downlink shared channel and that is different from the first feedback process ID, means for receiving an indication that the second feedback process ID is associated with the first feedback process ID, and means for transmitting feedback pertaining to the multicast data message based on at least one of the multicast downlink shared channel or the unicast downlink shared channel and the second feedback process ID being associated with the first feedback process ID.

A non-transitory computer-readable medium storing code for wireless communications at a UE is described. The code may include instructions executable by a processor to receive a first DCI message scheduling transmission of a multicast data message in a multicast downlink shared channel, the first DCI message also indicating a first feedback process ID associated with the multicast data message, receive a second DCI message scheduling a unicast downlink shared channel that includes a retransmission of the multicast data message, the second DCI message also indicating a second feedback process ID associated with the unicast downlink shared channel and that is different from the first feedback process ID, receive an indication that the second feedback process ID is associated with the first feedback process ID, and transmit feedback pertaining to the multicast data message based on at least one of the multicast downlink shared channel or the unicast downlink shared channel and the second feedback process ID being associated with the first feedback process ID.

Some examples of the method, apparatuses, and non-transitory computer-readable medium described herein may further include operations, features, means, or instructions for receiving the unicast downlink shared channel after a first scheduled feedback message corresponding to the multicast data message may be scheduled to be transmitted, the receiving of the unicast downlink shared channel being in accordance with a retransmission timing rule.

In some examples of the method, apparatuses, and non-transitory computer-readable medium described herein, the retransmission timing rule may be indicative that the unicast downlink shared channel may be to be received after an end of the first scheduled feedback message based on the second feedback process ID being associated with the first feedback process ID.

Some examples of the method, apparatuses, and non-transitory computer-readable medium described herein may further include operations, features, means, or instructions for receiving the unicast downlink shared channel before a first scheduled feedback message corresponding to the multicast data message may be scheduled to be transmitted, the receiving of the unicast downlink shared channel being in accordance with a retransmission timing rule.

In some examples of the method, apparatuses, and non-transitory computer-readable medium described herein, the retransmission timing rule specifies that the unicast downlink shared channel may be receivable before the first scheduled feedback message, even when the second feedback process ID may be associated with the first feedback process ID.

Some examples of the method, apparatuses, and non-transitory computer-readable medium described herein may further include operations, features, means, or instructions for decoding either the multicast data message or the retransmission of the multicast data message without soft-combining decoding results from the multicast data message and the retransmission of the multicast data message, where transmitting the feedback may be based on decoding only one of the multicast data message or the retransmission of the multicast data message.

In some examples of the method, apparatuses, and non-transitory computer-readable medium described herein, transmitting the feedback pertaining to at least one of the multicast downlink shared channel or the unicast downlink shared channel may include operations, features, means, or instructions for transmitting the feedback via either the first scheduled feedback message corresponding to the multicast data message or a second scheduled feedback message corresponding to the retransmission of the multicast data message.

In some examples of the method, apparatuses, and non-transitory computer-readable medium described herein, transmitting the feedback via either the first scheduled feedback message or the second scheduled feedback message may include operations, features, means, or instructions for transmitting the feedback via the second scheduled feedback message and either not transmitting the first scheduled feedback message or transmitting the first scheduled feedback message with invalid feedback.

In some examples of the method, apparatuses, and non-transitory computer-readable medium described herein, receiving the indication that the second feedback process ID may be associated with the first feedback process ID may include operations, features, means, or instructions for receiving the indication via either a radio resource control (RRC) message, the first DCI message, the second DCI message, or a medium access control-control element (MAC-CE).

In some examples of the method, apparatuses, and non-transitory computer-readable medium described herein, the unicast downlink shared channel may be scheduled to be received without overlap of the multicast downlink shared channel, in accordance with a scheduling rule that prohibits overlap of multiple downlink transmissions associated with a same feedback process ID.

In some examples of the method, apparatuses, and non-transitory computer-readable medium described herein, transmitting the feedback pertaining to at least one of the multicast downlink shared channel or the unicast downlink shared channel may include operations, features, means, or instructions for transmitting the feedback via at least one of a first scheduled feedback message corresponding to the multicast data message or a second scheduled feedback message corresponding to the retransmission of the multicast data message, where the second scheduled feedback message may be scheduled to be transmitted after transmission of the first scheduled feedback message in accordance with a scheduling rule that prohibits transmission of the second scheduled feedback message prior to transmission of the first scheduled feedback message.

In some examples of the method, apparatuses, and non-transitory computer-readable medium described herein, the retransmission of the multicast data message may be scheduled to be received after a last symbol of the multicast data message, in accordance with a scheduling rule that prohibits scheduling the retransmission of the multicast data message to begin prior to the last symbol of the multicast data message when the second DCI message may be received after the first DCI message.

In some examples of the method, apparatuses, and non-transitory computer-readable medium described herein, the retransmission of the multicast data message may be scheduled to be received at least a threshold number of symbols after a last symbol of a system information message, in accordance with a scheduling rule that prohibits scheduling a retransmission within less than the threshold number of symbols after the last symbol of the system information message, and the threshold number of symbols may be based on a subcarrier spacing (SCS) configuration.

A method for wireless communications at a UE is described. The method may include receiving a first DCI message scheduling transmission of a multicast data message in a multicast downlink shared channel, the first DCI message also indicating a feedback process ID associated with the multicast data message, receiving a second DCI message scheduling a unicast downlink shared channel that includes a retransmission of the multicast data message, the second DCI message also indicating the feedback process ID as being associated with the unicast downlink shared channel, and transmitting feedback pertaining to the multicast data message based on at least one of the multicast downlink shared channel or the unicast downlink shared channel and the feedback process ID being associated with both the multicast data message and the retransmission of the multicast data message.

An apparatus for wireless communications. The apparatus may include a processor, memory coupled with the processor, and instructions stored in the memory. The instructions may be executable by the processor to cause the apparatus to receive a first DCI message scheduling transmission of a multicast data message in a multicast downlink shared channel, the first DCI message also indicating a feedback process ID associated with the multicast data message, receive a second DCI message scheduling a unicast downlink shared channel that includes a retransmission of the multicast data message, the second DCI message also indicating the feedback process ID as being associated with the unicast downlink shared channel, and transmit feedback pertaining to the multicast data message based on at least one of the multicast downlink shared channel or the unicast downlink shared channel and the feedback process ID being associated with both the multicast data message and the retransmission of the multicast data message.

Another apparatus for wireless communications at a UE is described. The apparatus may include means for receiving a first DCI message scheduling transmission of a multicast data message in a multicast downlink shared channel, the first DCI message also indicating a feedback process ID associated with the multicast data message, means for receiving a second DCI message scheduling a unicast downlink shared channel that includes a retransmission of the multicast data message, the second DCI message also indicating the feedback process ID as being associated with the unicast downlink shared channel, and means for transmitting feedback pertaining to the multicast data message based on at least one of the multicast downlink shared channel or the unicast downlink shared channel and the feedback process ID being associated with both the multicast data message and the retransmission of the multicast data message.

A non-transitory computer-readable medium storing code for wireless communications at a UE is described. The code may include instructions executable by a processor to receive a first DCI message scheduling transmission of a multicast data message in a multicast downlink shared channel, the first DCI message also indicating a feedback process ID associated with the multicast data message, receive a second DCI message scheduling a unicast downlink shared channel that includes a retransmission of the multicast data message, the second DCI message also indicating the feedback process ID as being associated with the unicast downlink shared channel, and transmit feedback pertaining to the multicast data message based on at least one of the multicast downlink shared channel or the unicast downlink shared channel and the feedback process ID being associated with both the multicast data message and the retransmission of the multicast data message.

Some examples of the method, apparatuses, and non-transitory computer-readable medium described herein may further include operations, features, means, or instructions for receiving the unicast downlink shared channel after a first scheduled feedback message corresponding to the multicast data message may be scheduled to be transmitted, the receiving of the unicast downlink shared channel being in accordance with a retransmission timing rule.

In some examples of the method, apparatuses, and non-transitory computer-readable medium described herein, the retransmission timing rule may be indicative that the unicast downlink shared channel may be to be received after the first scheduled feedback message based on the feedback process ID being associated with both the multicast downlink shared channel and the unicast downlink shared channel.

A method for wireless communications at a base station is described. The method may include transmitting, to a UE, a first DCI message scheduling transmission of a multicast data message in a multicast downlink shared channel, the first DCI message also indicating a first feedback process ID associated with the multicast data message, transmitting a second DCI message scheduling a unicast downlink shared channel that includes a retransmission of the multicast data message, the second DCI message also indicating a second feedback process ID to be associated with the unicast downlink shared channel and that is different from the first feedback process ID, transmitting an indication that the second feedback process ID is associated with the first feedback process ID, and receiving, from the UE, feedback pertaining to the multicast data message based on at least one of the multicast downlink shared channel or the unicast downlink shared channel and the second feedback process ID being associated with the first feedback process ID.

An apparatus for wireless communications is described. The apparatus may include a processor, memory coupled with the processor, and instructions stored in the memory. The instructions may be executable by the processor to cause the apparatus to transmit, to a UE, a first DCI message scheduling transmission of a multicast data message in a multicast downlink shared channel, the first DCI message also indicating a first feedback process ID associated with the multicast data message, transmit a second DCI message scheduling a unicast downlink shared channel that includes a retransmission of the multicast data message, the second DCI message also indicating a second feedback process ID to be associated with the unicast downlink shared channel and that is different from the first feedback process ID, transmit an indication that the second feedback process ID is associated with the first feedback process ID, and receive, from the UE, feedback pertaining to the multicast data message based on at least one of the multicast downlink shared channel or the unicast downlink shared channel and the second feedback process ID being associated with the first feedback process ID.

Another apparatus for wireless communications at a base station is described. The apparatus may include means for transmitting, to a UE, a first DCI message scheduling transmission of a multicast data message in a multicast downlink shared channel, the first DCI message also indicating a first feedback process ID associated with the multicast data message, means for transmitting a second DCI message scheduling a unicast downlink shared channel that includes a retransmission of the multicast data message, the second DCI message also indicating a second feedback process ID to be associated with the unicast downlink shared channel and that is different from the first feedback process ID, means for transmitting an indication that the second feedback process ID is associated with the first feedback process ID, and means for receiving, from the UE, feedback pertaining to the multicast data message based on at least one of the multicast downlink shared channel or the unicast downlink shared channel and the second feedback process ID being associated with the first feedback process ID.

A non-transitory computer-readable medium storing code for wireless communications at a base station is described. The code may include instructions executable by a processor to transmit, to a UE, a first DCI message scheduling transmission of a multicast data message in a multicast downlink shared channel, the first DCI message also indicating a first feedback process ID associated with the multicast data message, transmit a second DCI message scheduling a unicast downlink shared channel that includes a retransmission of the multicast data message, the second DCI message also indicating a second feedback process ID to be associated with the unicast downlink shared channel and that is different from the first feedback process ID, transmit an indication that the second feedback process ID is associated with the first feedback process ID, and receive, from the UE, feedback pertaining to the multicast data message based on at least one of the multicast downlink shared channel or the unicast downlink shared channel and the second feedback process ID being associated with the first feedback process ID.

Some examples of the method, apparatuses, and non-transitory computer-readable medium described herein may further include operations, features, means, or instructions for transmitting the unicast downlink shared channel after a first scheduled feedback message corresponding to the multicast data message may be scheduled to be transmitted, transmission of the unicast downlink shared channel being in accordance with a retransmission timing rule.

In some examples of the method, apparatuses, and non-transitory computer-readable medium described herein, the retransmission timing rule may be indicative that the unicast downlink shared channel may be to be transmitted after an end of the first scheduled feedback message based on the second feedback process ID being associated with the first feedback process ID.

Some examples of the method, apparatuses, and non-transitory computer-readable medium described herein may further include operations, features, means, or instructions for transmitting the unicast downlink shared channel before a first scheduled feedback message corresponding to the multicast data message may be scheduled to be transmitted, transmission of the unicast downlink shared channel being in accordance with a retransmission timing rule.

In some examples of the method, apparatuses, and non-transitory computer-readable medium described herein, the retransmission timing rule specifies that the unicast downlink shared channel may be receivable before the first scheduled feedback message, even when the second feedback process ID may be associated with the first feedback process ID.

In some examples of the method, apparatuses, and non-transitory computer-readable medium described herein, receiving the feedback pertaining to at least one of the multicast downlink shared channel or the unicast downlink shared channel may include operations, features, means, or instructions for receiving the feedback via either the first scheduled feedback message corresponding to the multicast data message or a second scheduled feedback message corresponding to the retransmission of the multicast data message.

In some examples of the method, apparatuses, and non-transitory computer-readable medium described herein, receiving the feedback via either the first scheduled feedback message or the second scheduled feedback message may include operations, features, means, or instructions for receiving the feedback via the second scheduled feedback message and either not receiving the first scheduled feedback message or receiving the first scheduled feedback message with invalid feedback.

In some examples of the method, apparatuses, and non-transitory computer-readable medium described herein, transmitting the indication that the second feedback process ID may be associated with the first feedback process ID may include operations, features, means, or instructions for transmitting the indication via either an RRC message, the first DCI message, the second DCI message, or a MAC-CE.

In some examples of the method, apparatuses, and non-transitory computer-readable medium described herein, the retransmission of the multicast data message may be scheduled to be transmitted without overlap of the multicast data message, in accordance with a scheduling rule that prohibits overlap of multiple downlink transmissions associated with a same feedback process ID.

In some examples of the method, apparatuses, and non-transitory computer-readable medium described herein, receiving the feedback pertaining to at least one of the multicast downlink shared channel or the unicast downlink shared channel may include operations, features, means, or instructions for receiving the feedback via at least one of a first scheduled feedback message corresponding to the multicast data message or a second scheduled feedback message corresponding to the retransmission of the multicast data message, where the second scheduled feedback message may be scheduled to be received after reception of the first scheduled feedback message in accordance with a scheduling rule that prohibits reception of the second scheduled feedback message prior to reception of the first scheduled feedback message.

In some examples of the method, apparatuses, and non-transitory computer-readable medium described herein, the retransmission of the multicast data message may be scheduled to be transmitted after a last symbol of the multicast data message, in accordance with a scheduling rule that prohibits scheduling the retransmission of the multicast data message to begin prior to the last symbol of the multicast data message when the second DCI message may be transmitted after the first DCI message.

In some examples of the method, apparatuses, and non-transitory computer-readable medium described herein, the retransmission of the multicast data message may be scheduled to be transmitted at least a threshold number of symbols after a last symbol of a system information message, in accordance with a scheduling rule that prohibits scheduling a retransmission within less than the threshold number of symbols after the last symbol of the system information message, and the threshold number of symbols may be based on a SCS configuration.

A method for wireless communications at a base station is described. The method may include transmitting, to a UE, a first DCI message scheduling transmission of a multicast data message in a multicast downlink shared channel, the first DCI message also indicating a feedback process ID associated with the multicast data message, transmitting a second DCI message scheduling a unicast downlink shared channel that includes a retransmission of the multicast data message, the second DCI message also indicating the feedback process ID as being associated with the unicast downlink shared channel, and receiving feedback pertaining to the multicast data message based on at least one of the multicast downlink shared channel or the unicast downlink shared channel and the feedback process ID being associated with both the multicast data message and the retransmission of the multicast data message.

An apparatus for wireless communications is described. The apparatus may include a processor, memory coupled with the processor, and instructions stored in the memory. The instructions may be executable by the processor to cause the apparatus to transmit, to a UE, a first DCI message scheduling transmission of a multicast data message in a multicast downlink shared channel, the first DCI message also indicating a feedback process ID associated with the multicast data message, transmit a second DCI message scheduling a unicast downlink shared channel that includes a retransmission of the multicast data message, the second DCI message also indicating the feedback process ID as being associated with the unicast downlink shared channel, and receive feedback pertaining to the multicast data message based on at least one of the multicast downlink shared channel or the unicast downlink shared channel and the feedback process ID being associated with both the multicast data message and the retransmission of the multicast data message.

Another apparatus for wireless communications at a base station is described. The apparatus may include means for transmitting, to a UE, a first DCI message scheduling transmission of a multicast data message in a multicast downlink shared channel, the first DCI message also indicating a feedback process ID associated with the multicast data message, means for transmitting a second DCI message scheduling a unicast downlink shared channel that includes a retransmission of the multicast data message, the second DCI message also indicating the feedback process ID as being associated with the unicast downlink shared channel, and means for receiving feedback pertaining to the multicast data message based on at least one of the multicast downlink shared channel or the unicast downlink shared channel and the feedback process ID being associated with both the multicast data message and the retransmission of the multicast data message.

A non-transitory computer-readable medium storing code for wireless communications at a base station is described. The code may include instructions executable by a processor to transmit, to a UE, a first DCI message scheduling transmission of a multicast data message in a multicast downlink shared channel, the first DCI message also indicating a feedback process ID associated with the multicast data message, transmit a second DCI message scheduling a unicast downlink shared channel that includes a retransmission of the multicast data message, the second DCI message also indicating the feedback process ID as being associated with the unicast downlink shared channel, and receive feedback pertaining to the multicast data message based on at least one of the multicast downlink shared channel or the unicast downlink shared channel and the feedback process ID being associated with both the multicast data message and the retransmission of the multicast data message.

Some examples of the method, apparatuses, and non-transitory computer-readable medium described herein may further include operations, features, means, or instructions for transmitting the unicast downlink shared channel after a first scheduled feedback message corresponding to the multicast data message may be scheduled to be transmitted, the transmitting of the unicast downlink shared channel being in accordance with a retransmission timing rule.

In some examples of the method, apparatuses, and non-transitory computer-readable medium described herein, the retransmission timing rule may be indicative that the unicast downlink shared channel may be to be received after an end of the first scheduled feedback message based on the feedback process ID being associated with both the multicast data message and the retransmission of the multicast data message.

BRIEF DESCRIPTION OF THE DRAWINGS

FIGS. 3A, 3B, and 4 illustrate examples of resource diagrams that support a feedback process in multicast retransmission in accordance with aspects of the present disclosure.

DETAILED DESCRIPTION

In some wireless communications systems, a transmitting device, such as a base station, may schedule a multicast transmission to one or more receiving devices, such as user equipments (UEs), according to a point-to-multipoint (PTM) transmission scheme. The base station may schedule the PTM transmission on a group-common downlink shared channel using a group-common downlink control channel or a UE-specific downlink control channel. If the base station schedules the multicast transmission using a group-common downlink control channel and a UE supports feedback for the multicast transmission, the transmitting device may perform a retransmission using a point-to-point (PTP) transmission scheme. However, the UE may be unaware of how to keep the original multicast transmission and the subsequent PTP unicast transmissions linked for feedback purposes.

As described herein, a UE may receive an indication of a feedback process identifier (ID) (e.g., a hybrid automatic repeat request (HARQ) process ID) for an initial transmission of a data message according to a PTM transmission scheme that may be the same as the feedback process identifier for a retransmission of the data message according to a PTP transmission scheme or may be different than the feedback process identifier for the retransmission of the data message. If the feedback process identifier for the retransmission of the data message is different, the linkage between the different HARQ process IDs may be indicated to the UE via control signaling (e.g., via radio resource control (RRC) messaging, a DCI message, or a medium access control-control element (MAC-CE)). In some examples, the UE may not expect to receive a retransmission of a data message for a given HARQ process or for a given set of HARQ processes for a data message in a multicast downlink shared channel and an associated retransmission of the data message in a unicast downlink shared channel until after the end of the expected HARQ-acknowledgement (ACK) transmission for the associated HARQ processes according to a communication rule. Additionally or alternatively, if the communication rule is not updated, the retransmission of the data message with the different HARQ process ID may happen before the conclusion of the first HARQ process. Thus, the UE may decode and report HARQ-ACK without soft-combining the different transmissions, and may report HARQ-ACK on one of two HARQ-ACK transmission occasions.

Aspects of the disclosure are initially described in the context of wireless communications systems. Aspects of the disclosure are further described in the context of resource diagrams and a process flow. Aspects of the disclosure are further illustrated by and described with reference to apparatus diagrams, system diagrams, and flowcharts that relate to a feedback process in multicast retransmission.

Figure 1:
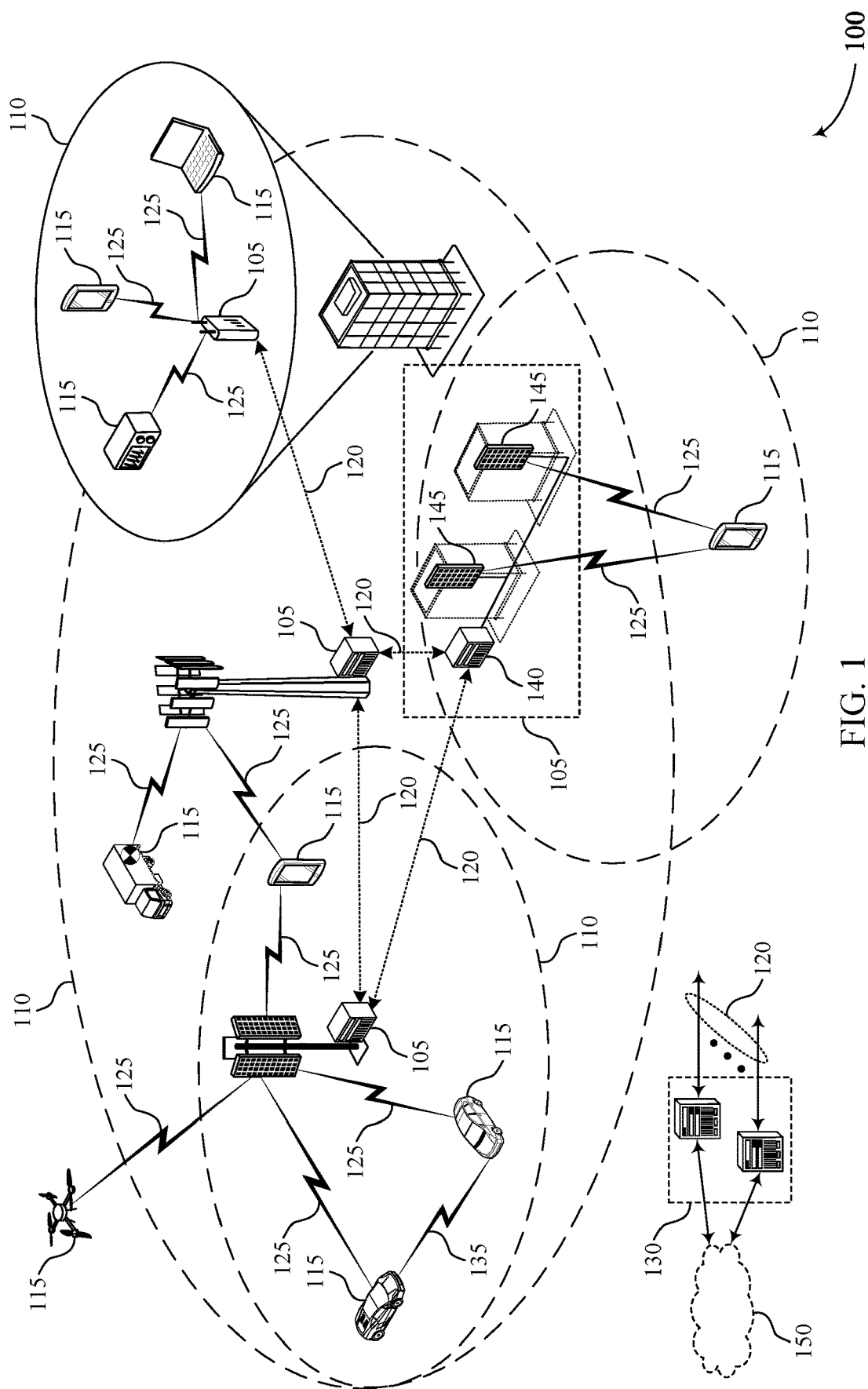
FIGS. 1 and 2 illustrate examples of wireless communications systems that support a feedback process in multicast retransmission in accordance with aspects of the present disclosure.

FIG. 1 illustrates an example of a wireless communications system 100 that supports a feedback process in multicast retransmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may be further divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may have an RRC state based on an RRC connection status. For example, a UE 115 may exchange data using a PTP transmission scheme with a base station 105, among other functions, while in an RRC connected state. The base station 105 may communicate with multiple wireless devices, such as multiple UEs 115, via unicast transmissions, a multicast transmission, a broadcast transmission, or a combination thereof. In some examples, the base station 105 may use the PTP transmission scheme for a unicast transmission and the PTM transmission scheme for a multicast transmission and a broadcast transmission. In some cases, a UE 115 communicating with the base station 105 may transmit feedback information based on receiving a transmission of a data message. The UE 115 may transmit the feedback information according to a HARQ feedback scheme. In some cases, if the UE 115 supports HARQ feedback for a PTM transmission scheme in an RRC connected state and if a base station 105 transmits an initial data message in a multicast downlink shared channel according to the PTM transmission scheme, the UE 115 may support retransmission of the data message in a unicast downlink shared channel using a PTP transmission scheme. In some cases, the UE 115 may be unaware of how to keep the original data message transmitted according to the PTM transmission scheme and the subsequent retransmission of the data message transmitted according to the PTP transmission scheme linked for feedback purposes.

In some cases, a base station 105 may transmit a downlink control information (DCI) message to one or more UEs 115 scheduling a multicast data message in a multicast downlink shared channel (e.g., a multicast PDSCH). The DCI message may indicate a feedback process ID, such as a HARQ ID, for the multicast data message. The base station may attempt to send the multicast data message in the multicast downlink shared channel according to a PTM transmission scheme. In some examples, the one or more UEs 115 may fail to receive the data message in the multicast downlink shared channel, may fail to decode the data message in the multicast downlink shared channel, or both. Thus, the base station 105 may transmit an additional DCI message to a UE 115 scheduling a retransmission of the multicast data message and indicating a HARQ ID to use for the retransmission of the multicast data. In some examples, the HARQ ID for the retransmission of the multicast data may be the same as the HARQ ID for the initial transmission of the multicast data. In some other examples, the HARQ ID for the retransmission of the multicast data may be different from the HARQ ID for the initial transmission of the multicast data. If the HARQ IDs are different, they may be linked via a higher-layer parameter. For example, a UE 115 may be configured by a higher-layer parameter that a HARQ ID for the retransmission of the multicast data may be associated with another HARQ ID, where the HARQ IDs are a pair. In some cases, the base station 105 may transmit the retransmission of the multicast data message in another multicast downlink shared channel according to the PTM transmission scheme. In some other cases, the base station 105 may transmit the retransmission of the multicast data message in a unicast downlink shared channel (e.g., a unicast PDSCH) according to a retransmission timing rule. The UE 115 may transmit feedback for the multicast data message based on receiving at least one of the initial transmission of the multicast data or the retransmission of the multicast data and the HARQ IDs for each.

Figure 2:
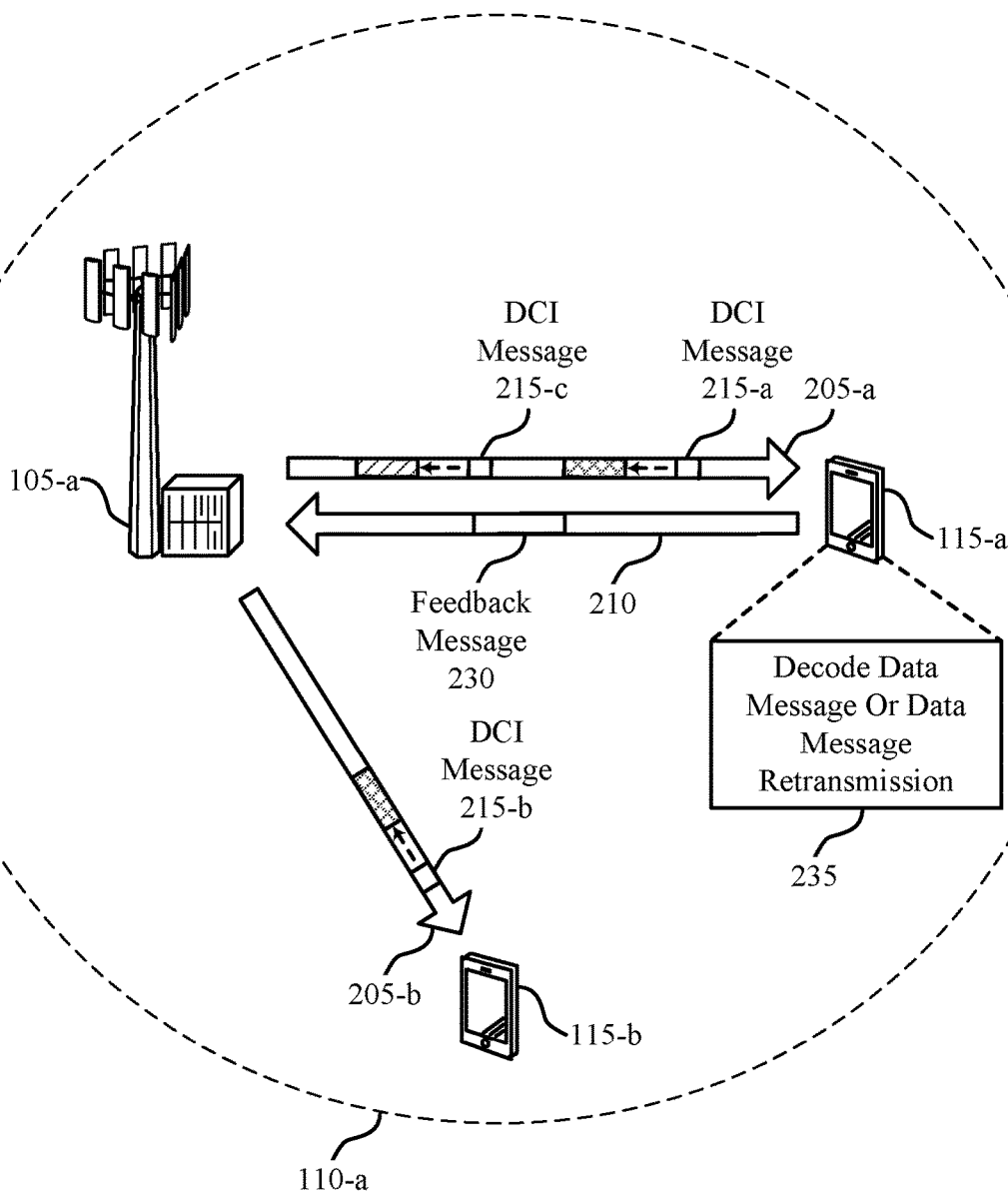

FIG. 2 illustrates an example of a wireless communications system 200 that supports a feedback process in multicast retransmission in accordance with aspects of the present disclosure. In some cases, wireless communications system 200 may implement aspects of wireless communications system 100 and may include UE 115-a, UE 115-b, and base station 105-a with coverage area 110-a, which may be examples of UEs 115 and a base station 105 with a coverage area 110 as described with reference to FIG. 1. In some cases, a UE 115 may receive control signaling, data, or both, from a base station 105 via a downlink communication link 205. Similarly, the UE 115 may transmit control signaling, data, or both, to the base station 105 via an uplink communication link 210. In some examples, base station 105-a may transmit control signaling scheduling transmission of a data message in a multicast downlink shared channel and additional control signaling scheduling a retransmission of the data message in a unicast downlink shared channel, where each control signaling indicates a feedback process ID, such as a HARQ ID.

In some cases, each UE 115 may have an RRC state based on an RRC connection status. For example, a UE 115 may operate in an RRC idle state during which the UE 115 may monitor for and receive transmissions or retransmissions according to a multicast transmission scheme or a broadcast transmission scheme as well as perform one or more measurements to establish a connection with a base station 105. Once the UE 115 establishes the connection with the base station 105, the UE 115 may move from the RRC idle state to an RRC connected or RRC inactive state. The UE 115 may broadcast system information, monitor for paging messages, may perform a cell re-selection procedure, or the like in the RRC inactive state. Additionally or alternatively, the UE 115 may exchange data using a PTP transmission scheme with the base station 105, among other functions, while in the RRC connected state.

In some cases, a base station 105, such as base station 105-a, may communicate with multiple wireless devices, such as UE 115-a, UE 115-b, or both, via a unicast transmission, a multicast transmission, a broadcast transmission, or a combination thereof. In some examples, base station 105-a may use a PTP transmission scheme for a unicast transmission and a PTM transmission scheme for a multicast transmission and a broadcast transmission. For example, for a PTP transmission scheme, base station 105-a may use a UE-specific control channel, such as a physical downlink control channel (PDCCH), which may have a cyclic redundancy check (CRC) scrambled by a UE-specific radio network temporary identifier (RNTI). In some examples, the RNTI may be a cell-RNTI (C-RNTI), which base station 105-a may use for identifying an RRC connection status and scheduling information for a UE 115, such as UE 115-a or UE 115-b. In some cases, the UE 115 receiving the unicast transmission according to the PTP transmission scheme may be in an RRC connected state. The UE-specific control channel may schedule a UE-specific shared channel, such as a physical downlink shared channel (PDSCH), which may be scrambled with the same UE-specific RNTI.

In some examples, there may be multiple types of PTM transmission schemes. In some examples of a PTM transmission scheme, UEs 115 operating in an RRC connected state and in a multicast broadcast services (MBS) group may use a group-common control channel (e.g., PDCCH) with CRC scrambled by a group-common RNTI. In some cases, the group-common RNTI may be configured to a group of UEs 115 via one or more cell-specific or UE-specific RRC messages. Each UE 115 may be unaware of a number of UEs 115 (e.g., how many UEs 115) that may be configured with the group-common RNTI. The group-common control channel may schedule a group-common shared channel (e.g., PDSCH), which may be scrambled with the same group-common RNTI. The PTM transmission scheme may be referred to as a group-common PDCCH based group scheduling scheme. In some other examples of a PTM transmission scheme, UEs 115 operating in an RRC connected state and in an MBS group may use a UE-specific control channel (e.g., PDCCH) with CRC scrambled by a UE-specific RNTI (e.g., C-RNTI). The UE-specific control channel may schedule a group-common shared channel (e.g., PDSCH), which may be scrambled with a group-common RNTI. The PTM transmission scheme may be referred to as a UE-specific PDCCH based group scheduling scheme.

In some examples, a UE-specific control channel or shared channel may be identified by a target UE 115, but not by the other UEs 115 in a same MBS group as the target UE 115. In some other examples, the group-common control channel or shared channel may be transmitted in a same set of time and frequency resources and may be identified by UEs 115 in a same MBS group.

In some cases, a UE 115, such as UE 115-a, UE 115-b, or both, may transmit feedback information based on receiving a transmission of a data message. For example, the UE 115 may transmit a positive acknowledgment (ACK) if the UE 115 receives a data message successfully, such as a data message in a downlink shared channel (e.g., PDSCH). Similarly, the UE 115 may transmit a negative acknowledgement (NACK) if the UE 115 receives the data message unsuccessfully (e.g., fails to receive the data message, fails to decode the data message, or both). In some examples, the UE 115 may transmit the feedback information according to a HARQ feedback scheme. In some cases, if the UE 115 supports HARQ-ACK feedback for a PTM transmission scheme, such as the group-common PDCCH based group scheduling scheme, in an RRC connected state and if a base station 105 transmits an initial data message in a multicast downlink shared channel according to the PTM transmission scheme, the UE 115 may support retransmission of the data message in a unicast downlink shared channel using a PTP transmission scheme. For example, The UE 115 may use one or more parameters in control signaling for the multicast downlink shared channel, such as a HARQ process ID and a new data indicator (NDI) indicated in a DCI message 215, to associate the multicast downlink shared channel and a retransmission of the data message in a transport block (TB) of a unicast downlink shared channel according to the PTP transmission scheme.

In some examples, such as for a data message in a unicast downlink shared channel, a feedback process, such as a HARQ process, may be assigned to the downlink shared channel (e.g., a PDSCH) by a scheduling message, which may be included in a DCI message 215. An NDI may remain unchanged if the downlink shared channel includes a retransmission of a previous transmission; however, the base station may change (e.g., toggle) the NDI if the transmission includes new data. In some cases, the UE 115 may be unaware of how to keep the original data message transmitted according to the PTM transmission scheme and the subsequent retransmission of the data message transmitted according to the PTP transmission scheme linked for feedback purposes.

In some cases, base station 105-a may send an initial data message in a multicast downlink shared channel 220, such as a multicast PDSCH, to UE 115-a, UE 115-b, or both according to a PTM transmission scheme. For example, if UE 115-a and UE 115-b are in an RRC connected state and members of a same MBS group, UE 115-a and UE 115-b may receive DCI message 215-a and DCI message 215-b, respectively, scheduling the multicast downlink shared channel 220. In some examples, UE 115-a may monitor for a data message in the multicast downlink shared channel 220 via downlink communication link 205-a based on receiving DCI message 215-a. Additionally or alternatively, UE 115-b may monitor for the multicast downlink shared channel 220 via downlink communication link 205-b based on receiving DCI message 215-b. In some examples, UE 115-a or UE 115-b may fail to receive the data message in the multicast downlink shared channel 220, may fail to decode the data message in the multicast downlink shared channel 220, or both. Thus, base station 105-b may schedule a retransmission of the data message in the multicast downlink shared channel 220. For example, base station 105-a may transmit one or more DCI messages 215 to UE 115-a, UE 115-b, or both to schedule a retransmission of the data message in a unicast downlink shared channel 225, such as a unicast PDSCH, or in another multicast downlink shared channel 220. For example, base station 105-a may send DCI message 215-c scheduling the unicast downlink shared channel 225 at UE 115-a. In some examples, base station 105-b may schedule a retransmission of the data message in the other multicast downlink shared channel 220 according to a PTM transmission scheme. In some other examples, base station 105-b may schedule the retransmission of the data message in the unicast downlink shared channel 225 according to a PTP transmission scheme.

In some cases, if base station 105-a transmits the retransmission of the data message in the other multicast downlink shared channel 220 according to a PTM transmission scheme, such as the group-common PDCCH based group scheduling scheme, the other multicast downlink shared channel 220 may be scheduled by a DCI format with a group-common RNTI. That is, DCI message 215-c may include a group-common RNTI. In some examples, DCI message 215-c may indicate a same feedback process, such as a same HARQ process, as DCI message 215-a. In some other cases, if base station 105-a transmits the retransmission of the data message in the unicast downlink shared channel 225 according to a PTP transmission scheme, the unicast downlink shared channel 225 may be scheduled by a DCI format with a UE-specific RNTI (e.g., C-RNTI). In some cases, DCI message 215-c may indicate a same feedback process ID, such as a same HARQ process ID, as DCI message 215-a for the data message in the multicast downlink shared channel 220. In some other cases, DCI message 215-c may indicate a different feedback process ID, such as a same HARQ process ID, as DCI message 215-a for the data message in the multicast downlink shared channel 220.

In some examples, UE 115-a, UE 115-b, or both may transmit a feedback message 230 based on receiving the data message in the multicast downlink shared channel 220, the retransmission of the data message in the unicast downlink shared channel 225, or both successfully. For example, at 235, UE 115-a may decode the multicast downlink shared channel 220 or the unicast downlink shared channel 225 and may transmit a HARQ-ACK based on a retransmission timing rule. In some cases, if base station 105-a transmits the data message in the multicast downlink shared channel 220 according to a PTM transmission scheme with a same HARQ ID as a retransmission of the data message, UE 115-a may not expect to receive another downlink shared channel transmission (e.g., a unicast PDSCH transmission, a multicast PDSCH transmission, or both) for a given HARQ process until after the end of the expected transmission of a feedback message 230 (e.g., an ACK) for that HARQ process, which is described in further detail with respect to FIG. 3A.

In some cases, if base station 105-a transmits the retransmission of the data message in the unicast downlink shared channel 225 according to a PTP transmission scheme with a different HARQ ID, UE 115-a may not expect to receive another downlink shared channel transmission for a given HARQ process or for a given set of HARQ processes for a data message transmitted according to a PTM transmission scheme and an associated retransmission of the data message according to a PTP transmission scheme until after the end of the expected transmission of feedback for that HARQ process. Base station 105-a may configure UE 115-a to use the different HARQ IDs via RRC signaling, a DCI format, or a MAC-CE with an association between two HARQ processes that may be used for the multicast downlink shared channel 220 and the unicast downlink shared channel 225, which is described in further detail with respect to FIG. 3B.

In some examples, if different HARQ processes are assigned to a data message in the multicast downlink shared channel 220 and a retransmission of the data message in the unicast downlink shared channel 225, UE 115-*a* may receive the unicast downlink shared channel 225 before the end of the expected transmission of feedback for the data message in the multicast downlink shared channel 220. However, UE 115-*a* may not completely decode the multicast downlink shared channel 220 with a HARQ process when UE 115-*a* receives the unicast downlink shared channel 225. Thus, UE 115-*a* may decode the downlink message in the multicast downlink shared channel 220 and the retransmission of the downlink message in the unicast downlink shared channel 225 without soft-combining the downlink shared channels, may transmit a feedback message 230 during at least one of two feedback occasions for the multicast downlink shared channel 220 or the unicast downlink shared channel 225, or may drop or transmit an invalid feedback message 230 during a feedback occasion for the multicast downlink shared channel 220, which is described in further detail with respect to FIG. 4.

At 235, UE 115-*a* may decode the data message in the multicast downlink shared channel 220 or the data message retransmission in the unicast downlink shared channel 225. UE 115-*a* may transmit a feedback message 230, such as an ACK or a NACK, for the data message, the retransmission of the data message, or both. Base station 105-*a* may determine whether to continue repeating the data message, or transmit a new data message, based on the feedback message 230.

FIGS. 3A and 3B illustrate examples of resource diagrams 300 that support a feedback process in multicast retransmission in accordance with aspects of the present disclosure. In some examples, the resource diagram 300 may implement aspects of wireless communications system 100 and wireless communications system 200. For example, the resource diagram 300 may be implemented by one or more UEs 115 and a base station 105 as described with reference to FIGS. 1 and 2. In some cases, a base station may transmit a data message 305 to one or more UEs in a multicast downlink shared channel according to a PTM transmission scheme 310 and a data message retransmission 315 based on a feedback process at the one or more UEs.

In some examples, a base station may schedule transmission of a data message 305 for one or more UEs via a DCI message 320. The base station may transmit the data message 305 in a multicast downlink shared channel (e.g., a multicast PDSCH) according to a PTM transmission scheme 310. For example, the base station may transmit DCI message 320-*a* to a UE, which may schedule data message 305-*a* in a multicast downlink shared channel. The DCI message 320 may indicate a feedback process ID, such as a HARQ ID, for the data message 305. The UE may use the HARQ ID to determine when to send a feedback message 325 to the base station for the data message 305. The feedback message 325 may include an ACK if the UE successfully receives the data message 305 or may include a NACK if the UE unsuccessfully receives the data message 305. For example, the UE may send feedback message 325-*a* based on monitoring for data message 305-*a* in the multicast downlink shared channel.

In some examples, the base station may schedule a retransmission of the data message 305 according to a retransmission timing rule. For example, the base station may schedule a retransmission based on a gap 330, such as a time duration or a number of symbols, between a scheduled feedback message 325 and a data message retransmission 315. In some examples, as illustrated in FIG. 3A, the base station may transmit DCI message 320-*b* to a UE that may schedule data message retransmission 315-*a* in a multicast downlink shared channel. That is, the base station may transmit the data message retransmission 315-*a* according to a PTM transmission scheme 310. DCI message 320-*b* may include a group-common RNTI scheduling data message retransmission 315-*a*. In some cases, DCI message 320-*b* may indicate a same feedback process ID, such as a same HARQ ID, as DCI message 320-*a*.

In some examples, the base station may transmit data message retransmission 315-*a* according to a retransmission timing rule based on the feedback process IDs for the data message 305-*a* and the data message retransmission 315-*a* being the same. For example, the retransmission timing rule may specify that the UE may not expect to receive another downlink shared channel for a given feedback process until after the end of an expected transmission of a feedback message 325 for that feedback process. That is, the UE may not expect to receive data message retransmission 315-*a* in a multicast downlink shared channel until after receiving feedback message 325-*a*. In some other cases, the UE may not expect to receive data message retransmission 315-*a* until after a time duration, such as gap 330-*a*, which may be a number of symbols. In some examples, the UE may transmit feedback message 325-*b* based on receiving data message 305-*a* in the multicast downlink shared channel, data message retransmission 315-*a* in the multicast downlink shared channel, or both successfully. For example, the UE may decode the data message and may transmit a HARQ-ACK in feedback message 325-*b*.

In some cases, as illustrated in FIG. 3B, the base station may transmit DCI message 320-*c* to a UE that may schedule a data transmission 305-*b* in a multicast downlink shared channel according to a PTM transmission scheme 310. DCI message 320-*c* may indicate a feedback process ID, such as a HARQ ID, for feedback message 325-*c*. In some examples, the UE may unsuccessfully receive data message 305-*b*, so the base station may transmit additional control signaling, such as DCI message 320-*d*, that may schedule data message retransmission 315-*b* in a unicast downlink shared channel. That is, the base station may transmit the data message retransmission 315-*b* according to a PTP transmission scheme 335. DCI message 320-*b* may include a different feedback process ID for feedback message 325-*d* than the feedback process ID indicated in DCI message 320-*c*.

In some examples, the base station may transmit data message retransmission 315-*b* according to a retransmission timing rule based on the feedback process IDs for the data message 305-*b* and the data message retransmission 315-*b* being different. For example, the retransmission timing rule may specify that the UE may not expect to receive another downlink shared channel for a given set of feedback processes for a data message 305-*b* and a data message retransmission 315-*b* until after the end of an expected transmission of a feedback message 325 for each feedback process. That is, the UE may not expect to receive data message retransmission 315-*b* in a unicast downlink shared channel until after receiving feedback message 325-*c* or until after feedback message 325-*c* is scheduled for transmission (e.g., the feedback occasion). In some other cases, the UE may not expect to receive data message retransmission 315-*b* until after a time duration, such as gap 330-*b*, which may be a number of symbols. In some examples, the UE may transmit feedback message 325-*d* based on receiving data message 305-*b* in the multicast downlink shared channel, data message retransmission 315-*b* in the unicast downlink shared channel, or both successfully. For example, the UE may decode the data message 305 and may transmit a HARQ-ACK in feedback message 325-*d*.

In some cases, for both feedback processes for the data message 305-*b* and the data message retransmission 315-*b*, the two sequences of DCI message 320, downlink shared channel, and feedback message 325 (e.g., DCI, PDSCH, HARQ-ACK), different HARQ processes can be assigned. In some examples, the base station may configure the UE with an association between two feedback processes (e.g., HARQ processes) that may be used for a data message 305 according to a PTM transmission scheme 310 and a data message retransmission 315 according to a PTP transmission scheme 335. For example, the base station may configure the association via RRC signaling, a DCI format, a MAC-CE, or the like.

In some examples, a gap 330 may extend from the end of a feedback occasion for a feedback message 325 to a beginning of a downlink control channel (e.g., PDCCH) including a DCI message 320. For example, as illustrated in FIG. 3A, gap 330-*c* may extend from the end of an expected feedback message 325-*a* to the beginning of DCI message 320-*b*. Similarly, as illustrated in FIG. 3B, gap 330-*d* may extend from the end of an expected feedback message 325-*c* to the beginning of DCI message 320-*d*. In some cases, UE 115-*a* may not expect to receive a downlink control channel (e.g., PDCCH) for a DCI message 320 scheduling another downlink shared channel transmission for a given HARQ process or for a given set of HARQ processes for a data message 305 transmitted according to a PTM transmission scheme and an associated retransmission of the data message according to a PTP transmission scheme until after the end of the expected transmission of feedback for that HARQ process.

Figure 4:
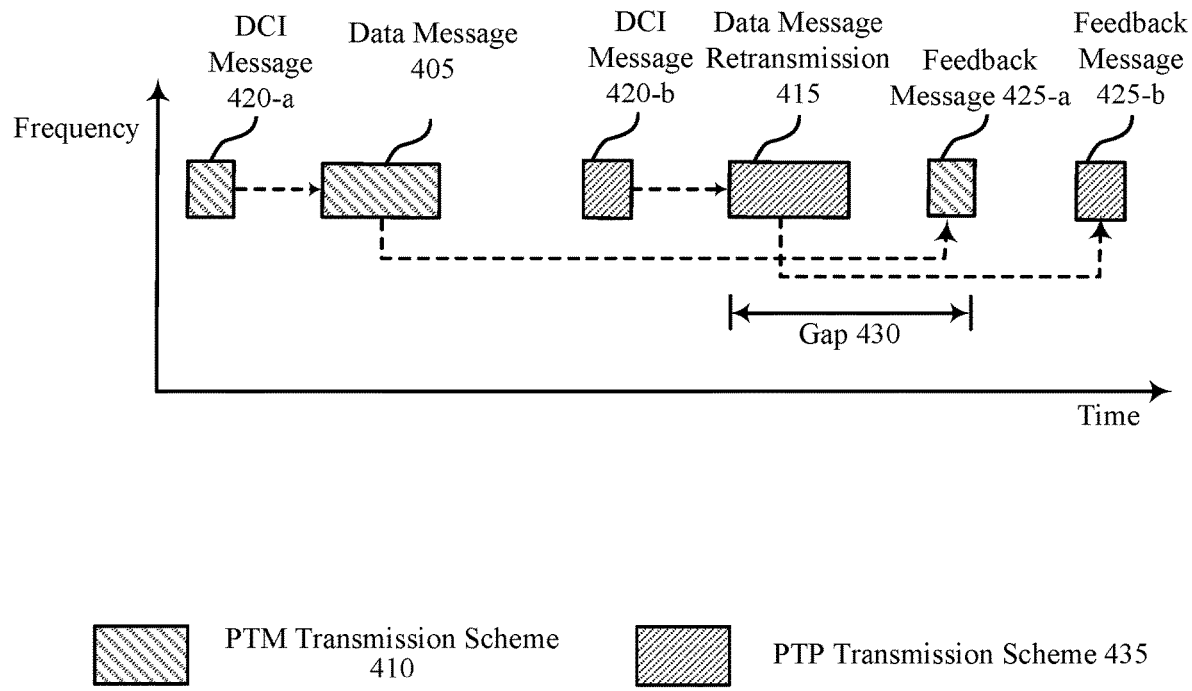

FIG. 4 illustrates an example of a resource diagram 400 that supports a feedback process in multicast retransmission in accordance with aspects of the present disclosure. In some examples, the resource diagram 400 may implement aspects of wireless communications system 100, wireless communications system 200, and resource diagrams 300. For example, the resource diagram 400 may be implemented by one or more UEs 115 and a base station 105 as described with reference to FIGS. 1 and 2. In some cases, a base station may transmit a data message 405 to one or more UEs in a multicast downlink shared channel according to a PTM transmission scheme 410 and a data message retransmission 415 based on a feedback process at the one or more UEs.

In some cases, the base station may transmit a DCI message 420 to a UE that may schedule a data transmission 405 in a multicast downlink shared channel according to a PTM transmission scheme 410. For example, the base station may transmit DCI message 420-*a* to the UE, which may indicate a feedback process ID, such as a HARQ ID, for a feedback message 425 (e.g., feedback message 425-*a*). In some examples, the UE may unsuccessfully receive the data message 405, so the base station may transmit additional control signaling, such as DCI message 420-*b*, that may schedule the data message retransmission 415 in a unicast downlink shared channel. That is, the base station may transmit the data message retransmission 415 according to a PTP transmission scheme 435. DCI message 420-*b* may include a different feedback process ID for feedback message 425-*b* than the feedback process ID indicated in DCI message 420-*a*.

In some examples, the base station may transmit the data message retransmission 415 according to a retransmission timing rule based on the feedback process IDs for the data message 405 and the data message retransmission 415 being different. For example, if different feedback processes are assigned to the data message 405 transmitted according to the PTM transmission scheme 410 and a data message retransmission 415 transmitted according to the PTP transmission scheme 435, the UE may receive the data message retransmission 415 before the end of the expected transmission of feedback message 425-*a* for data message 405 (e.g., a HARQ-ACK for data message 405). However, the UE may not complete the decoding for the multicast downlink shared channel including the data message 405 with an associated feedback process when the UE starts receiving the data message retransmission 415.

In some cases, the UE may decode the data message 405, the data message retransmission 415, or both without soft-combining the two downlink shared channels (e.g., a multicast PDSCH for the data message 405 and a unicast PDSCH for the data message retransmission 415). The UE may use either the multicast downlink shared channel for the data message 405 with an initial feedback process (e.g., a HARQ process) or the unicast downlink shared channel for the data message retransmission 415 with a subsequent feedback process that is different from the initial feedback process to determine the decoding results. In some examples, the UE may transmit a valid feedback message 425 (e.g., a HARQ-ACK) during at least one of the two feedback occasions for feedback message 425-*a* and feedback message 425-*b*. For example, the UE may transmit a valid feedback message 425-*b* during the later feedback occasion for data message retransmission 415.

In some examples, the UE may drop a feedback message 425, such as feedback message 425-*a*, or may transmit invalid feedback during the feedback occasion for feedback message 425-*a* if feedback message 425-*b* is valid. In some examples, the UE may wait for a duration, such as a gap 430, prior to transmitting feedback message 425-*b*. The gap 430 may be a configured duration or may be a number of symbols. The UE may decode the data message 405, the data message retransmission 415, or both and may transmit a HARQ-ACK to the base station in feedback message 425-*b*.

Figure 5:
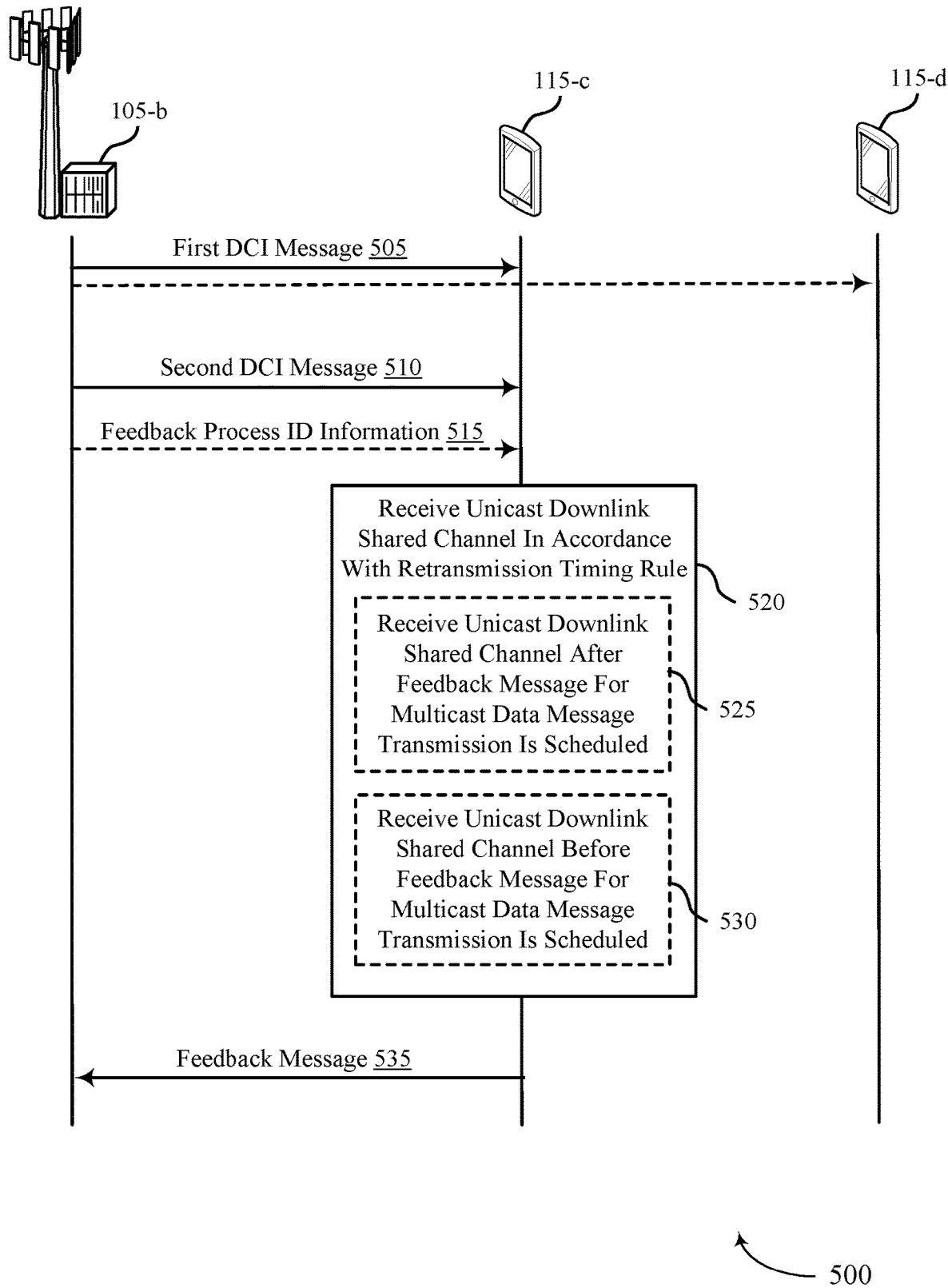
FIG. 5 illustrates an example of a process flow that supports a feedback process in multicast retransmission in accordance with aspects of the present disclosure.

FIG. 5 illustrates an example of a process flow 500 that supports a feedback process in multicast retransmission in accordance with aspects of the present disclosure. In some examples, process flow 500 may implement aspects of wireless communications system 100, wireless communications system 200, resource diagrams 300, and resource diagram 400. The process flow 500 may illustrate an example of a base station 105, such as base station 105-*b*, transmitting a data message to one or more UEs 115, such as UE 115-*c* and UE 115-*d*, in a multicast downlink shared channel according to a PTM transmission scheme and a data message retransmission based on a feedback process at the one or more UEs 115. Alternative examples of the following may be implemented, where some processes are performed in a different order than described or are not performed. In some cases, processes may include additional features not mentioned below, or further processes may be added.

At 505, base station 105-*b* may transmit a first DCI message to UE 115-*c*, UE 115-*d*, or both, scheduling transmission of a multicast data message in a multicast downlink shared channel (e.g., a multicast PDSCH). The first DCI message may indicate a first feedback process ID (e.g., HARQ ID) for a feedback message for the multicast data message.

At 510, base station 105-*b* may transmit a second DCI message to UE 115-*c* scheduling a unicast downlink shared channel (e.g., a unicast PDSCH) that includes a retransmission of the multicast data message. The second DCI message may indicate a second feedback process ID (e.g., a second HARQ ID) for a feedback message for the unicast downlink shared channel. In some cases, the second feedback process ID may be different from the first feedback process ID. In some other cases, the second feedback process ID may be the same as the first feedback process ID.

At 515, base station 105-b may transmit an indication that the second feedback process ID is associated with the first feedback process ID. For example, base station 105-b may transmit an RRC message, a DCI format, a MAC-CE, or the like indicating the feedback process IDs are associated.

At 520, UE 115-c may receive the unicast downlink shared channel in accordance with a retransmission timing rule.

For example, at 525, UE 115-c may receive the unicast downlink shared channel after a first scheduled feedback message for the multicast data message is scheduled to be transmitted. The retransmission timing rule may be indicative that the unicast downlink shared channel is to be received after an end of the first scheduled feedback message based on the second feedback process ID being associated with the first feedback process ID.

In some other examples, at 530, UE 115-c may receive the unicast downlink shared channel before a first scheduled feedback message for the multicast data message is scheduled to be transmitted. The retransmission timing rule may specify that the unicast downlink shared channel is receivable before the first scheduled feedback message, even when the second feedback process ID may be associated with the first feedback process ID. UE 115-c may decode either the multicast data message or the retransmission of the multicast data message without soft-combining decoding results from the multicast data message and the retransmission of the multicast data message. UE 115-c may transmit the feedback based on decoding the multicast data message or the retransmission of the multicast data message. In some cases, UE 115-c may transmit the feedback via either the first scheduled feedback message for the multicast data message or a second scheduled feedback message for the retransmission of the multicast data message.

In some cases, the unicast downlink shared channel may be scheduled to be received by UE 115-c without overlap of the multicast downlink shared channel in accordance with a scheduling rule that prohibits overlap of multiple downlink transmissions associated with a same feedback process ID.

At 535, UE 115-c may transmit feedback pertaining to the multicast data message based on at least one of the multicast downlink shared channel or the unicast downlink shared channel. In some cases, UE 115-c may transmit the feedback to base station 105-b based on the second feedback process ID being associated with the first feedback process ID. In some examples, UE 115-c may transmit the feedback via at least one of a first scheduled feedback message for the multicast data message or a second scheduled feedback message for the retransmission of the multicast data message. In some cases, the second scheduled feedback message may be scheduled to be transmitted after transmission of the first scheduled feedback message in accordance with a scheduling rule that prohibits transmission of the second scheduled feedback message prior to transmission of the first scheduled feedback message. UE 115-c may transmit the feedback via the second scheduled feedback message and may not transmit the first scheduled feedback message or transmit the first scheduled feedback message with invalid feedback.

In some cases, base station 105-b may schedule the retransmission of the multicast data message to be received by UE 115-c after a last symbol of the multicast data message in accordance with a scheduling rule that prohibits scheduling the retransmission of the multicast data message to begin prior to the last symbol of the multicast data message when the second DCI message is received after the first DCI message.

In some other cases, base station 105-b may schedule the retransmission of the multicast data message to be received at least a threshold number of symbols after a last symbol of a system information message in accordance with a scheduling rule that prohibits scheduling a retransmission within less than the threshold number of symbols after the last symbol of the system information message. In some examples, the threshold number of symbols may be based on a subcarrier spacing (SCS) configuration.

Figure 6:
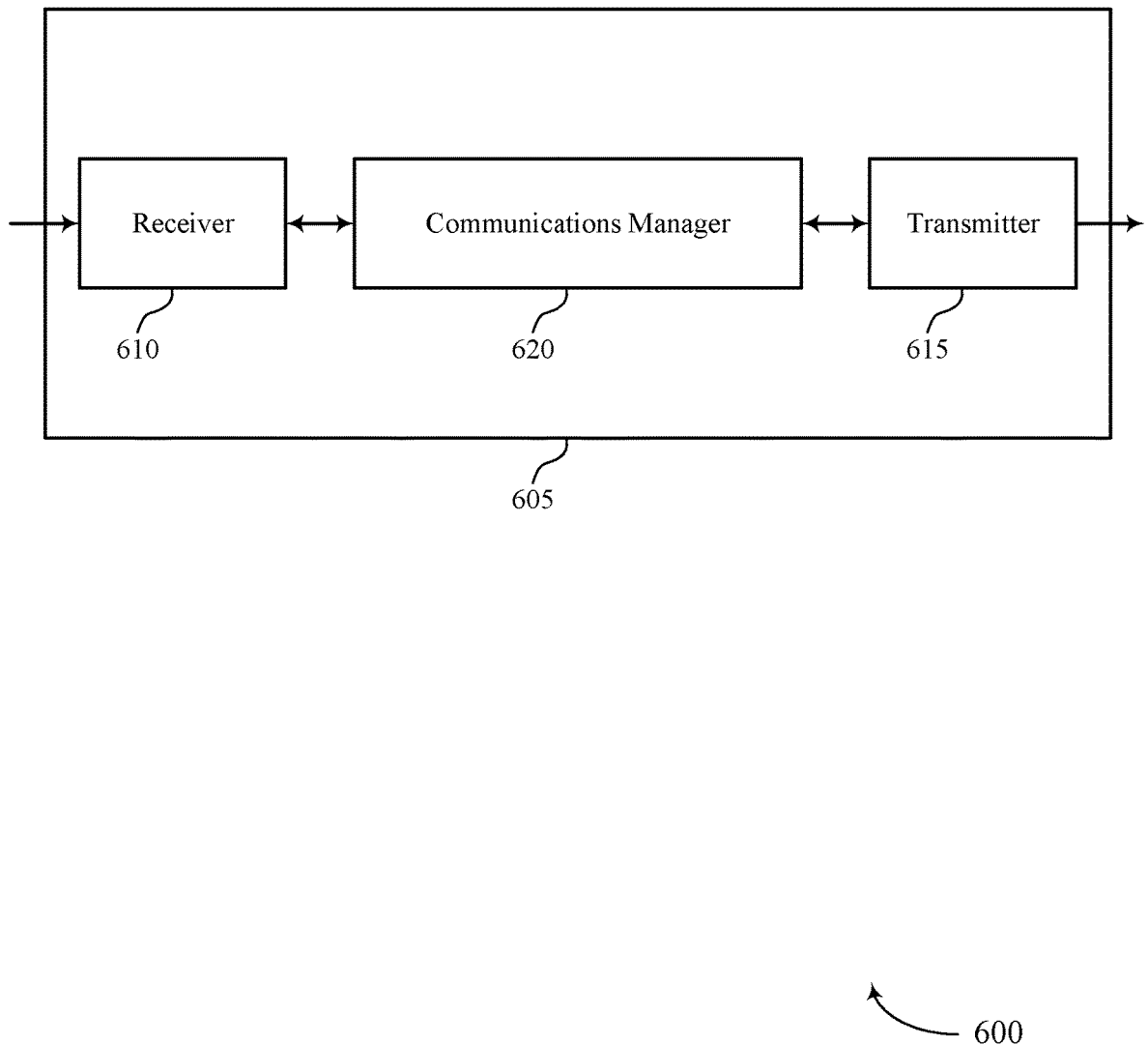
FIGS. 6 and 7 show block diagrams of devices that support a feedback process in multicast retransmission in accordance with aspects of the present disclosure.

FIG. 6 shows a block diagram 600 of a device 605 that supports a feedback process in multicast retransmission in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to a feedback process in multicast retransmission). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to a feedback process in multicast retransmission). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of a feedback process in multicast retransmission as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving a first DCI message scheduling transmission of a multicast data message in a multicast downlink shared channel, the first DCI message also indicating a first feedback process ID associated with the multicast data message. The communications manager 620 may be configured as or otherwise support a means for receiving a second DCI message scheduling a unicast downlink shared channel that includes a retransmission of the multicast data message, the second DCI message also indicating a second feedback process ID associated with the unicast downlink shared channel and that is different from the first feedback process ID. The communications manager 620 may be configured as or otherwise support a means for receiving an indication that the second feedback process ID is associated with the first feedback process ID. The communications manager 620 may be configured as or otherwise support a means for transmitting feedback pertaining to the multicast data message based on at least one of the multicast downlink shared channel or the unicast downlink shared channel and the second feedback process ID being associated with the first feedback process ID.

Additionally or alternatively, the communications manager 620 may support wireless communications at a UE in accordance with examples as disclosed herein. For example, the communications manager 620 may be configured as or otherwise support a means for receiving a first DCI message scheduling transmission of a multicast data message in a multicast downlink shared channel, the first DCI message also indicating a feedback process ID associated with the multicast data message. The communications manager 620 may be configured as or otherwise support a means for receiving a second DCI message scheduling a unicast downlink shared channel that includes a retransmission of the multicast data message, the second DCI message also indicating the feedback process ID as being associated with the unicast downlink shared channel. The communications manager 620 may be configured as or otherwise support a means for transmitting feedback pertaining to the multicast data message based on at least one of the multicast downlink shared channel or the unicast downlink shared channel and the feedback process ID being associated with both the multicast data message and the retransmission of the multicast data message.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for a base station to transmit a data message to one or more UEs in a multicast downlink shared channel according to a PTM transmission scheme and a data message retransmission based on a feedback process at the one or more UEs, which may reduce processing, reduce power consumption, cause more efficient utilization of communication resources, and the like.

Figure 7:
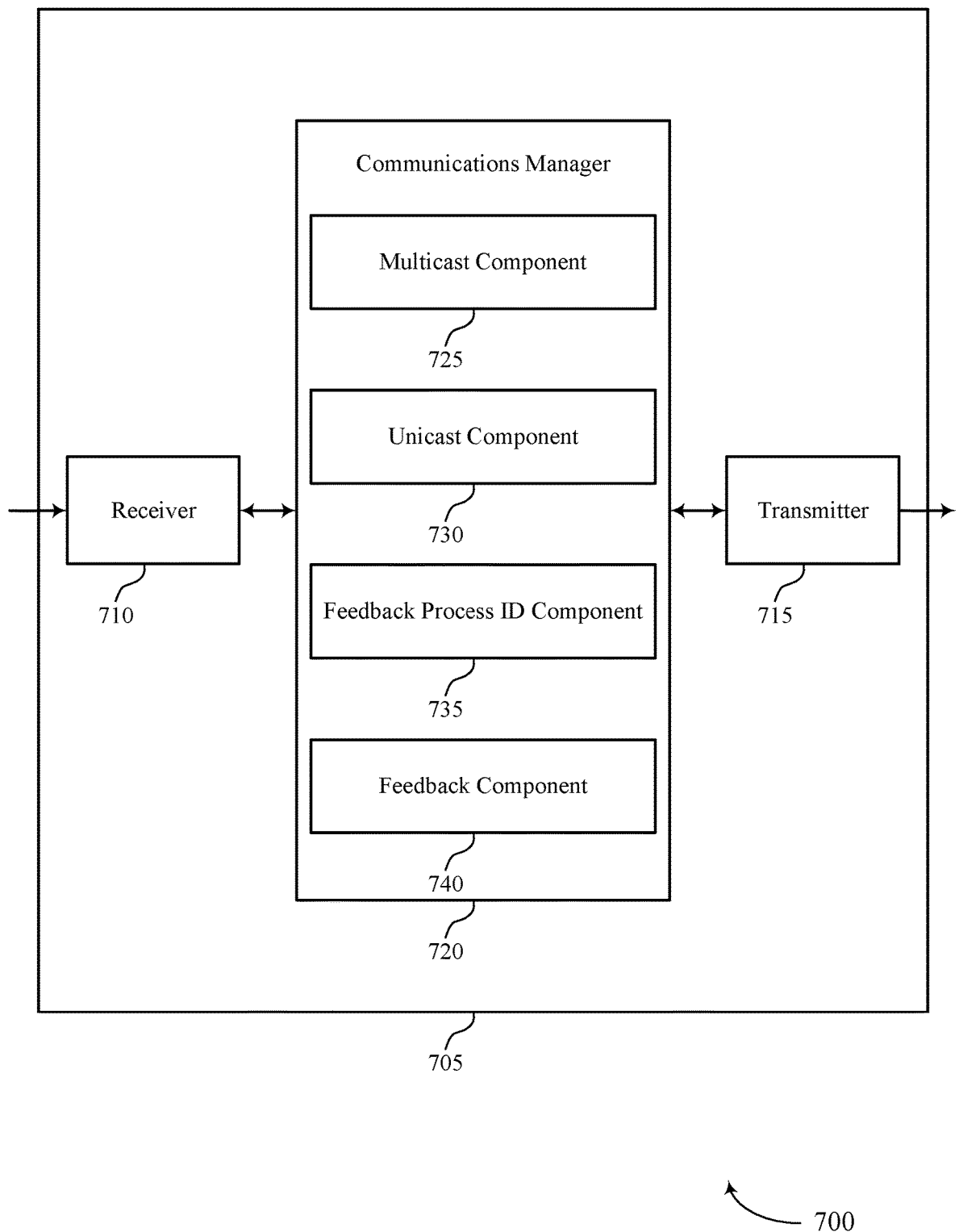

FIG. 7 shows a block diagram 700 of a device 705 that supports a feedback process in multicast retransmission in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to a feedback process in multicast retransmission). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to a feedback process in multicast retransmission). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of a feedback process in multicast retransmission as described herein. For example, the communications manager 720 may include a multicast component 725, a unicast component 730, a feedback process ID component 735, a feedback component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The multicast component 725 may be configured as or otherwise support a means for receiving a first DCI message scheduling transmission of a multicast data message in a multicast downlink shared channel, the first DCI message also indicating a first feedback process ID associated with the multicast data message. The unicast component 730 may be configured as or otherwise support a means for receiving a second DCI message scheduling a unicast downlink shared channel that includes a retransmission of the multicast data message, the second DCI message also indicating a second feedback process ID associated with the unicast downlink shared channel and that is different from the first feedback process ID. The feedback process ID component 735 may be configured as or otherwise support a means for receiving an indication that the second feedback process ID is associated with the first feedback process ID. The feedback component 740 may be configured as or otherwise support a means for transmitting feedback pertaining to the multicast data message based on at least one of the multicast downlink shared channel or the unicast downlink shared channel and the second feedback process ID being associated with the first feedback process ID.

Additionally or alternatively, the communications manager 720 may support wireless communications at a UE in accordance with examples as disclosed herein. The multicast component 725 may be configured as or otherwise support a means for receiving a first DCI message scheduling transmission of a multicast data message in a multicast downlink shared channel, the first DCI message also indicating a feedback process ID associated with the multicast data message. The unicast component 730 may be configured as or otherwise support a means for receiving a second DCI message scheduling a unicast downlink shared channel that includes a retransmission of the multicast data message, the second DCI message also indicating the feedback process ID as being associated with the unicast downlink shared channel. The feedback component 740 may be configured as or otherwise support a means for transmitting feedback pertaining to the multicast data message based on at least one of the multicast downlink shared channel or the unicast downlink shared channel and the feedback process ID being associated with both the multicast data message and the retransmission of the multicast data message.

Figure 8:
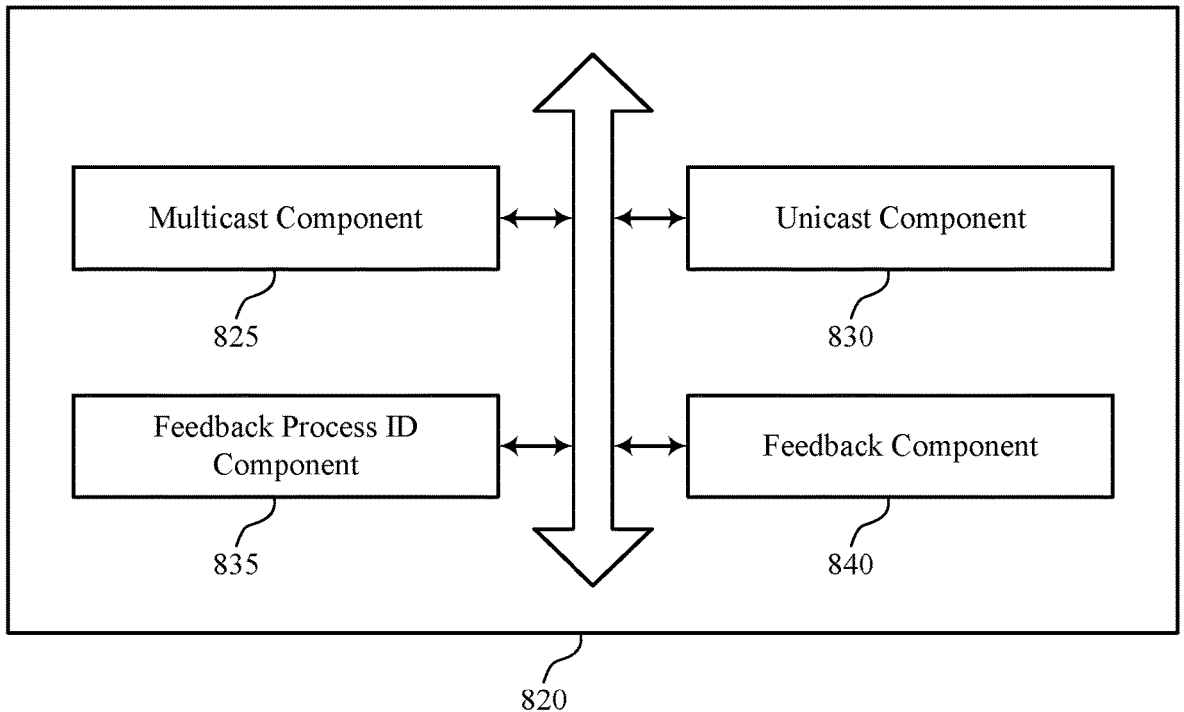
FIG. 8 shows a block diagram of a communications manager that supports a feedback process in multicast retransmission in accordance with aspects of the present disclosure.

FIG. 8 shows a block diagram 800 of a communications manager 820 that supports a feedback process in multicast retransmission in accordance with aspects of the present disclosure. The communications manager 820 may be an example of aspects of a communications manager 620, a communications manager 720, or both, as described herein. The communications manager 820, or various components thereof, may be an example of means for performing various aspects of a feedback process in multicast retransmission as described herein. For example, the communications manager 820 may include a multicast component 825, a unicast component 830, a feedback process ID component 835, a feedback component 840, or any combination thereof. Each of these components may communicate, directly or indirectly, with one another (e.g., via one or more buses).

The communications manager 820 may support wireless communications at a UE in accordance with examples as disclosed herein. The multicast component 825 may be configured as or otherwise support a means for receiving a first DCI message scheduling transmission of a multicast data message in a multicast downlink shared channel, the first DCI message also indicating a first feedback process ID associated with the multicast data message. The unicast component 830 may be configured as or otherwise support a means for receiving a second DCI message scheduling a unicast downlink shared channel that includes a retransmission of the multicast data message, the second DCI message also indicating a second feedback process ID associated with the unicast downlink shared channel and that is different from the first feedback process ID. The feedback process ID component 835 may be configured as or otherwise support a means for receiving an indication that the second feedback process ID is associated with the first feedback process ID. The feedback component 840 may be configured as or otherwise support a means for transmitting feedback pertaining to the multicast data message based on at least one of the multicast downlink shared channel or the unicast downlink shared channel and the second feedback process ID being associated with the first feedback process ID.

In some examples, the unicast component 830 may be configured as or otherwise support a means for receiving the unicast downlink shared channel after a first scheduled feedback message corresponding to the multicast data message is scheduled to be transmitted, the receiving of the unicast downlink shared channel being in accordance with a retransmission timing rule.

In some examples, the retransmission timing rule is indicative that the unicast downlink shared channel is to be received after an end of the first scheduled feedback message based on the second feedback process ID being associated with the first feedback process ID.

In some examples, the unicast component 830 may be configured as or otherwise support a means for receiving the unicast downlink shared channel before a first scheduled feedback message corresponding to the multicast data message is scheduled to be transmitted, the receiving of the unicast downlink shared channel being in accordance with a retransmission timing rule.

In some examples, the retransmission timing rule specifies that the unicast downlink shared channel is receivable before the first scheduled feedback message, even when the second feedback process ID is associated with the first feedback process ID.

In some examples, the feedback component 840 may be configured as or otherwise support a means for decoding either the multicast data message or the retransmission of the multicast data message without soft-combining decoding results from the multicast data message and the retransmission of the multicast data message, where transmitting the feedback is based on decoding only one of the multicast data message or the retransmission of the multicast data message.

In some examples, to support transmitting the feedback pertaining to at least one of the multicast downlink shared channel or the unicast downlink shared channel, the feedback component 840 may be configured as or otherwise support a means for transmitting the feedback via either the first scheduled feedback message corresponding to the multicast data message or a second scheduled feedback message corresponding to the retransmission of the multicast data message.

In some examples, to support transmitting the feedback via either the first scheduled feedback message or the second scheduled feedback message, the feedback component 840 may be configured as or otherwise support a means for transmitting the feedback via the second scheduled feedback message and either not transmitting the first scheduled feedback message or transmitting the first scheduled feedback message with invalid feedback.

In some examples, to support receiving the indication that the second feedback process ID is associated with the first feedback process ID, the feedback process ID component 835 may be configured as or otherwise support a means for receiving the indication via either a radio resource control message, the first DCI message, the second DCI message, or a medium access control-control element.

In some examples, the unicast downlink shared channel is scheduled to be received without overlap of the multicast downlink shared channel, in accordance with a scheduling rule that prohibits overlap of multiple downlink transmissions associated with a same feedback process ID.

In some examples, to support transmitting the feedback pertaining to at least one of the multicast downlink shared channel or the unicast downlink shared channel, the feedback component 840 may be configured as or otherwise support a means for transmitting the feedback via at least one of a first scheduled feedback message corresponding to the multicast data message or a second scheduled feedback message corresponding to the retransmission of the multicast data message, where the second scheduled feedback message is scheduled to be transmitted after transmission of the first scheduled feedback message in accordance with a scheduling rule that prohibits transmission of the second scheduled feedback message prior to transmission of the first scheduled feedback message.

In some examples, the retransmission of the multicast data message is scheduled to be received after a last symbol of the multicast data message, in accordance with a scheduling rule that prohibits scheduling the retransmission of the multicast data message to begin prior to the last symbol of the multicast data message when the second DCI message is received after the first DCI message.

In some examples, the retransmission of the multicast data message is scheduled to be received at least a threshold number of symbols after a last symbol of a system information message, in accordance with a scheduling rule that prohibits scheduling a retransmission within less than the threshold number of symbols after the last symbol of the system information message. In some examples, the threshold number of symbols is based on a SCS configuration.

Additionally or alternatively, the communications manager 820 may support wireless communications at a UE in accordance with examples as disclosed herein. In some examples, the multicast component 825 may be configured as or otherwise support a means for receiving a first DCI message scheduling transmission of a multicast data message in a multicast downlink shared channel, the first DCI message also indicating a feedback process ID associated with the multicast data message. In some examples, the unicast component 830 may be configured as or otherwise support a means for receiving a second DCI message scheduling a unicast downlink shared channel that includes a retransmission of the multicast data message, the second DCI message also indicating the feedback process ID as being associated with the unicast downlink shared channel. In some examples, the feedback component 840 may be configured as or otherwise support a means for transmitting feedback pertaining to the multicast data message based on at least one of the multicast downlink shared channel or the unicast downlink shared channel and the feedback process ID being associated with both the multicast data message and the retransmission of the multicast data message.

In some examples, the unicast component 830 may be configured as or otherwise support a means for receiving the unicast downlink shared channel after a first scheduled feedback message corresponding to the multicast data message is scheduled to be transmitted, the receiving of the unicast downlink shared channel being in accordance with a retransmission timing rule.

In some examples, the retransmission timing rule is indicative that the unicast downlink shared channel is to be received after the first scheduled feedback message based on the feedback process ID being associated with both the multicast downlink shared channel and the unicast downlink shared channel.

Figure 9:
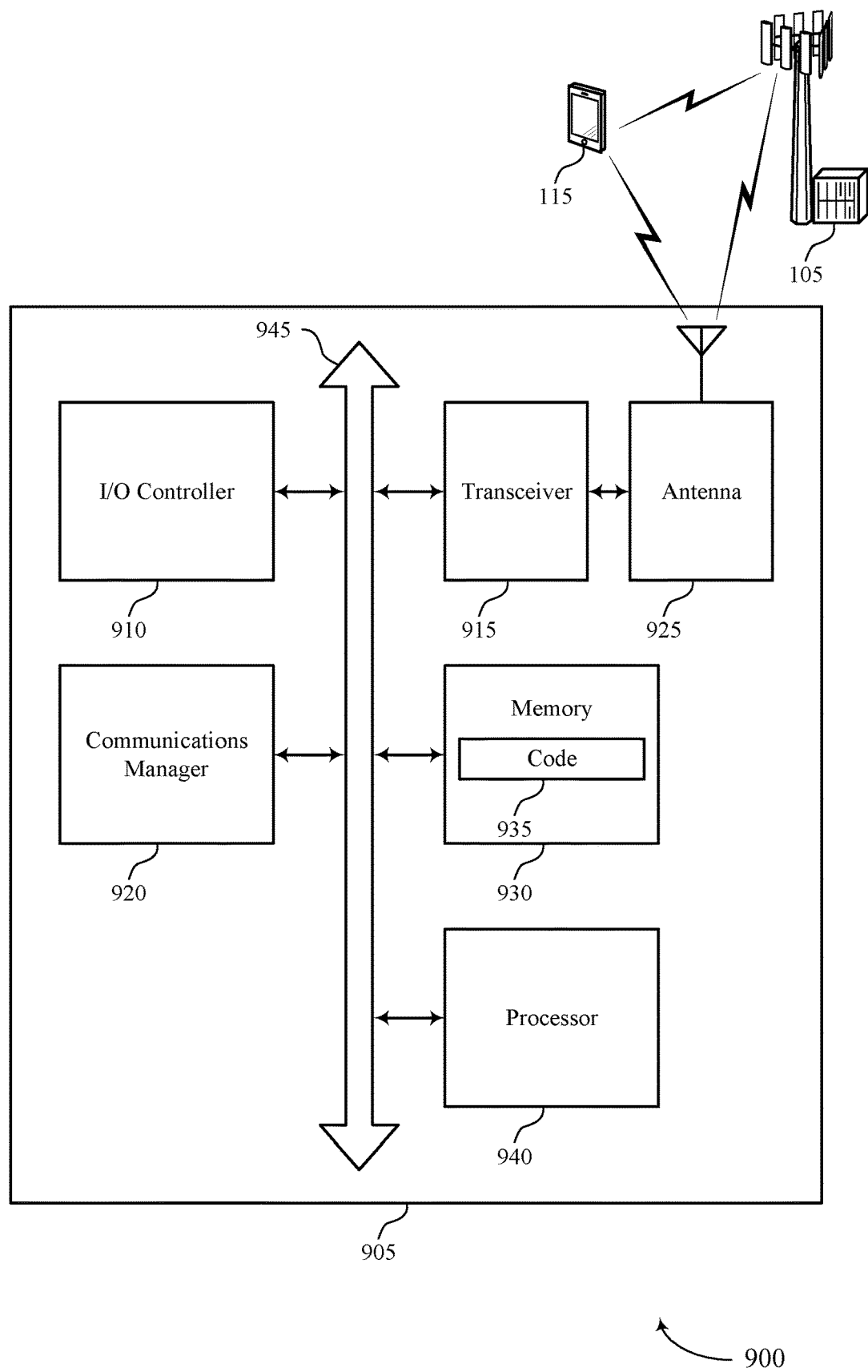
FIG. 9 shows a diagram of a system including a device that supports a feedback process in multicast retransmission in accordance with aspects of the present disclosure.

FIG. 9 shows a diagram of a system 900 including a device 905 that supports a feedback process in multicast retransmission in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting a feedback process in multicast retransmission). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving a first DCI message scheduling transmission of a multicast data message in a multicast downlink shared channel, the first DCI message also indicating a first feedback process ID associated with the multicast data message. The communications manager 920 may be configured as or otherwise support a means for receiving a second DCI message scheduling a unicast downlink shared channel that includes a retransmission of the multicast data message, the second DCI message also indicating a second feedback process ID associated with the unicast downlink shared channel and that is different from the first feedback process ID. The communications manager 920 may be configured as or otherwise support a means for receiving an indication that the second feedback process ID is associated with the first feedback process ID. The communications manager 920 may be configured as or otherwise support a means for transmitting feedback pertaining to the multicast data message based on at least one of the multicast downlink shared channel or the unicast downlink shared channel and the second feedback process ID being associated with the first feedback process ID.

Additionally or alternatively, the communications manager 920 may support wireless communications at a UE in accordance with examples as disclosed herein. For example, the communications manager 920 may be configured as or otherwise support a means for receiving a first DCI message scheduling transmission of a multicast data message in a multicast downlink shared channel, the first DCI message also indicating a feedback process ID associated with the multicast data message. The communications manager 920 may be configured as or otherwise support a means for receiving a second DCI message scheduling a unicast downlink shared channel that includes a retransmission of the multicast data message, the second DCI message also indicating the feedback process ID as being associated with the unicast downlink shared channel. The communications manager 920 may be configured as or otherwise support a means for transmitting feedback pertaining to the multicast data message based on at least one of the multicast downlink shared channel or the unicast downlink shared channel and the feedback process ID being associated with both the multicast data message and the retransmission of the multicast data message.

By including or configuring the communications manager 920 in accordance with examples as described herein, the device 905 may support techniques for a base station to transmit a data message to one or more UEs in a multicast downlink shared channel according to a PTM transmission scheme and a data message retransmission based on a feedback process at the one or more UEs, which may improve communication reliability, reduce latency, improve user experience related to reduced processing, reduce power consumption, cause more efficient utilization of communication resources, improve coordination between devices, improve battery life, improve utilization of processing capability, and the like.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of a feedback process in multicast retransmission as described herein, or the processor 940 and the memory 930 may be otherwise configured to perform or support such operations.

Figure 10:
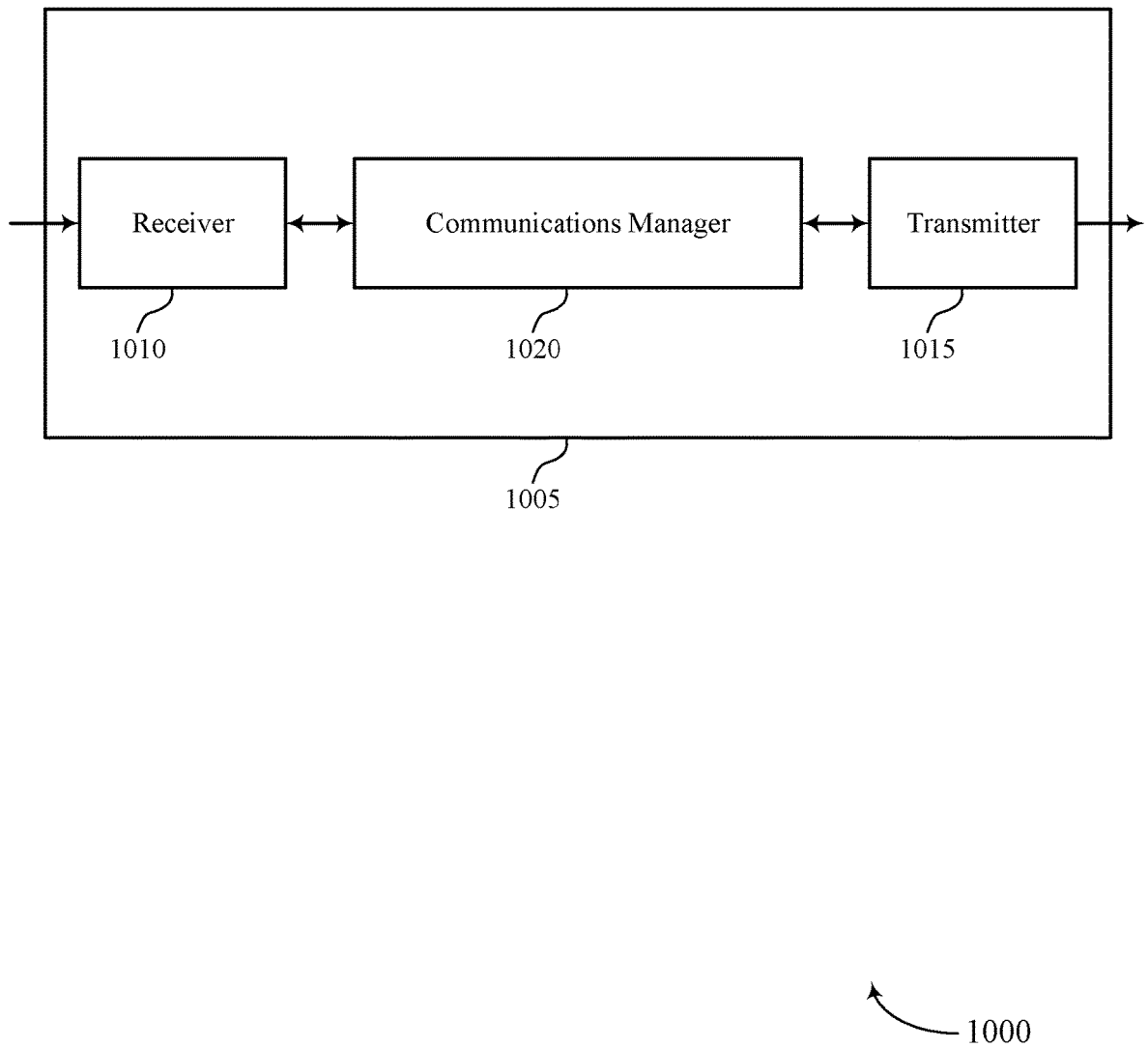
FIGS. 10 and 11 show block diagrams of devices that support a feedback process in multicast retransmission in accordance with aspects of the present disclosure.

FIG. 10 shows a block diagram 1000 of a device 1005 that supports a feedback process in multicast retransmission in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to a feedback process in multicast retransmission). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to a feedback process in multicast retransmission). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of a feedback process in multicast retransmission as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, a first DCI message scheduling transmission of a multicast data message in a multicast downlink shared channel, the first DCI message also indicating a first feedback process ID associated with the multicast data message. The communications manager 1020 may be configured as or otherwise support a means for transmitting a second DCI message scheduling a unicast downlink shared channel that includes a retransmission of the multicast data message, the second DCI message also indicating a second feedback process ID to be associated with the unicast downlink shared channel and that is different from the first feedback process ID. The communications manager 1020 may be configured as or otherwise support a means for transmitting an indication that the second feedback process ID is associated with the first feedback process ID. The communications manager 1020 may be configured as or otherwise support a means for receiving, from the UE, feedback pertaining to the multicast data message based on at least one of the multicast downlink shared channel or the unicast downlink shared channel and the second feedback process ID being associated with the first feedback process ID.

Additionally or alternatively, the communications manager 1020 may support wireless communications at a base station in accordance with examples as disclosed herein. For example, the communications manager 1020 may be configured as or otherwise support a means for transmitting, to a UE, a first DCI message scheduling transmission of a multicast data message in a multicast downlink shared channel, the first DCI message also indicating a feedback process ID associated with the multicast data message. The communications manager 1020 may be configured as or otherwise support a means for transmitting a second DCI message scheduling a unicast downlink shared channel that includes a retransmission of the multicast data message, the second DCI message also indicating the feedback process ID as being associated with the unicast downlink shared channel. The communications manager 1020 may be configured as or otherwise support a means for receiving feedback pertaining to the multicast data message based on at least one of the multicast downlink shared channel or the unicast downlink shared channel and the feedback process ID being associated with both the multicast data message and the retransmission of the multicast data message.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for a base station to transmit a data message to one or more UEs in a multicast downlink shared channel according to a PTM transmission scheme and a data message retransmission based on a feedback process at the one or more UEs, which may reduce processing, reduce power consumption, cause more efficient utilization of communication resources, and the like.

Figure 11:
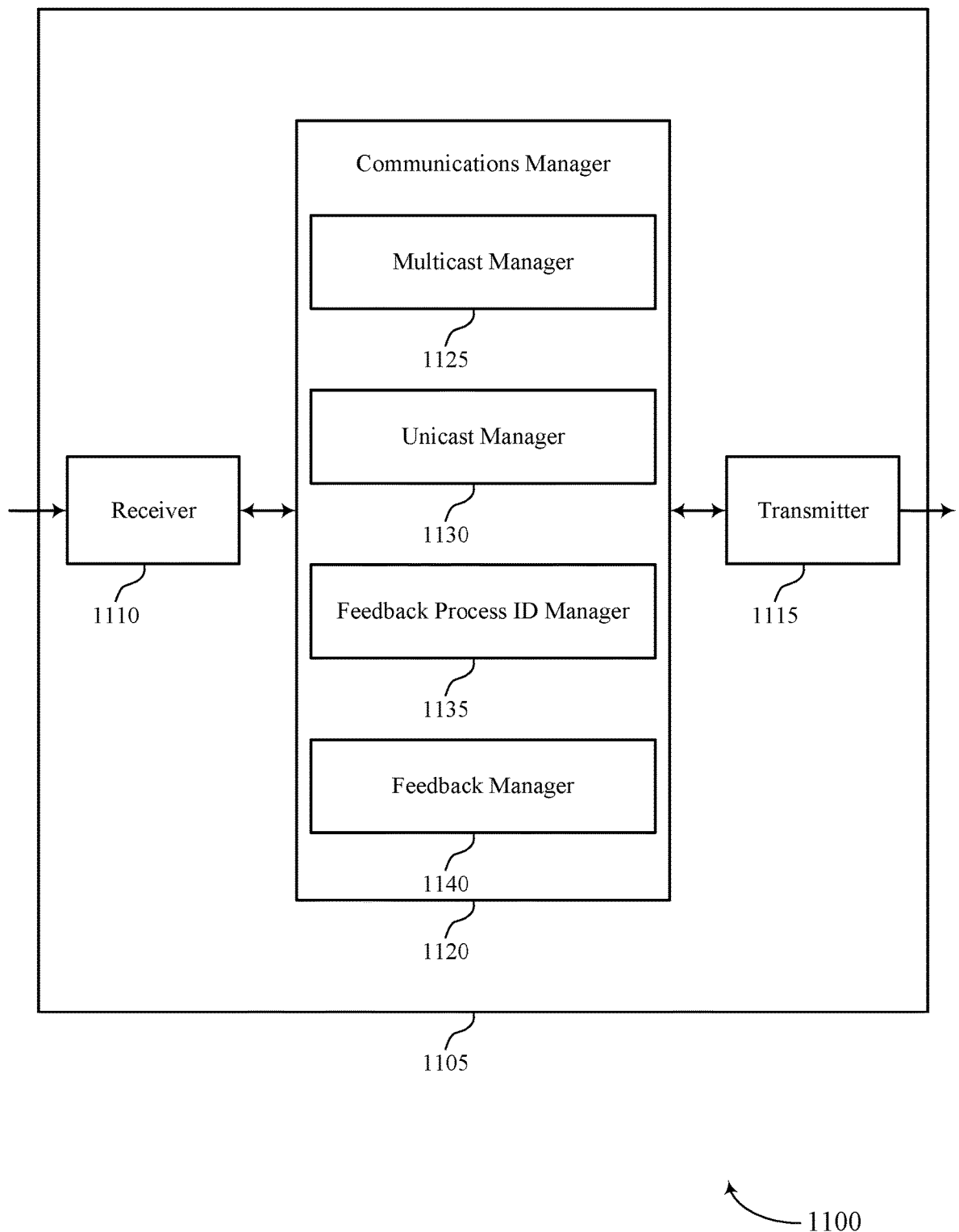

FIG. 11 shows a block diagram 1100 of a device 1105 that supports a feedback process in multicast retransmission in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to a feedback process in multicast retransmission). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to a feedback process in multicast retransmission). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of a feedback process in multicast retransmission as described herein. For example, the communications manager 1120 may include a multicast manager 1125, a unicast manager 1130, a feedback process ID manager 1135, a feedback manager 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The multicast manager 1125 may be configured as or otherwise support a means for transmitting, to a UE, a first DCI message scheduling transmission of a multicast data message in a multicast downlink shared channel, the first DCI message also indicating a first feedback process ID associated with the multicast data message. The unicast manager 1130 may be configured as or otherwise support a means for transmitting a second DCI message scheduling a unicast downlink shared channel that includes a retransmission of the multicast data message, the second DCI message also indicating a second feedback process ID to be associated with the unicast downlink shared channel and that is different from the first feedback process ID. The feedback process ID manager 1135 may be configured as or otherwise support a means for transmitting an indication that the second feedback process ID is associated with the first feedback process ID. The feedback manager 1140 may be configured as or otherwise support a means for receiving, from the UE, feedback pertaining to the multicast data message based on at least one of the multicast downlink shared channel or the unicast downlink shared channel and the second feedback process ID being associated with the first feedback process ID.

Additionally or alternatively, the communications manager 1120 may support wireless communications at a base station in accordance with examples as disclosed herein. The multicast manager 1125 may be configured as or otherwise support a means for transmitting, to a UE, a first DCI message scheduling transmission of a multicast data message in a multicast downlink shared channel, the first DCI message also indicating a feedback process ID associated with the multicast data message. The unicast manager 1130 may be configured as or otherwise support a means for transmitting a second DCI message scheduling a unicast downlink shared channel that includes a retransmission of the multicast data message, the second DCI message also indicating the feedback process ID as being associated with the unicast downlink shared channel. The feedback manager 1140 may be configured as or otherwise support a means for receiving feedback pertaining to the multicast data message based on at least one of the multicast downlink shared channel or the unicast downlink shared channel and the feedback process ID being associated with both the multicast data message and the retransmission of the multicast data message.

Figure 12:
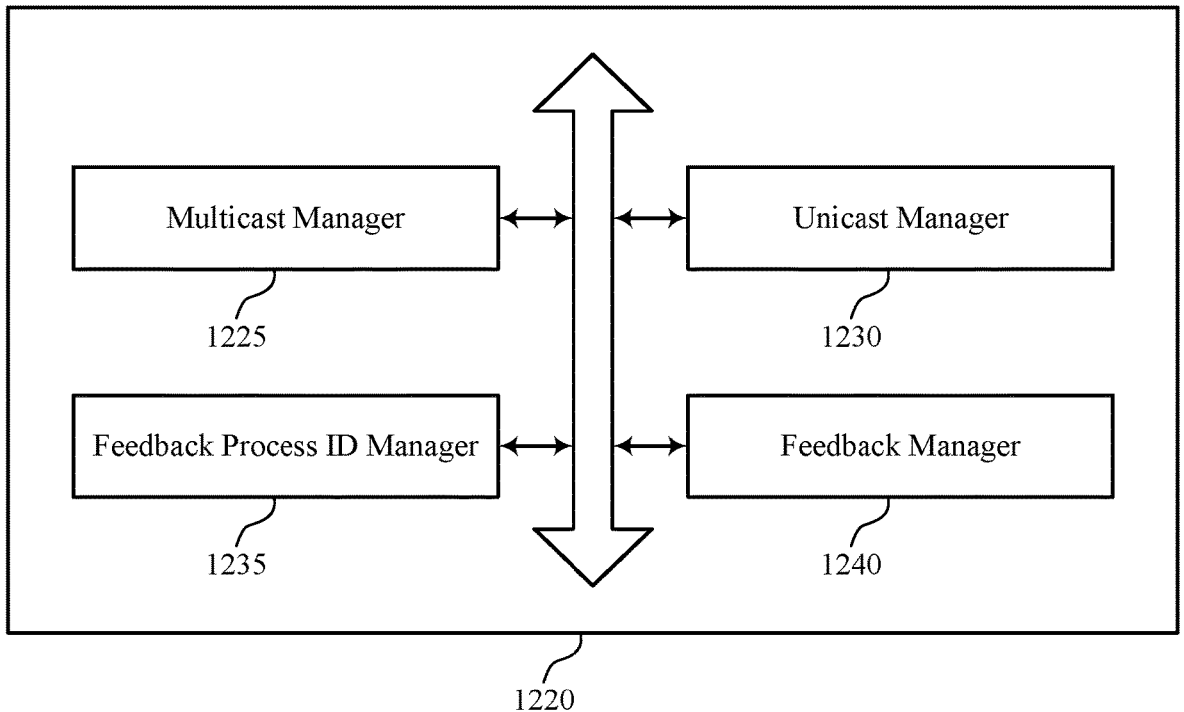
FIG. 12 shows a block diagram of a communications manager that supports a feedback process in multicast retransmission in accordance with aspects of the present disclosure.

FIG. 12 shows a block diagram 1200 of a communications manager 1220 that supports a feedback process in multicast retransmission in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of a feedback process in multicast retransmission as described herein. For example, the communications manager 1220 may include a multicast manager 1225, a unicast manager 1230, a feedback process ID manager 1235, a feedback manager 1240, or any combination thereof. Each of these components may communicate, directly or indirectly, with one another (e.g., via one or more buses).

The communications manager 1220 may support wireless communications at a base station in accordance with examples as disclosed herein. The multicast manager 1225 may be configured as or otherwise support a means for transmitting, to a UE, a first DCI message scheduling transmission of a multicast data message in a multicast downlink shared channel, the first DCI message also indicating a first feedback process ID associated with the multicast data message. The unicast manager 1230 may be configured as or otherwise support a means for transmitting a second DCI message scheduling a unicast downlink shared channel that includes a retransmission of the multicast data message, the second DCI message also indicating a second feedback process ID to be associated with the unicast downlink shared channel and that is different from the first feedback process ID. The feedback process ID manager 1235 may be configured as or otherwise support a means for transmitting an indication that the second feedback process ID is associated with the first feedback process ID. The feedback manager 1240 may be configured as or otherwise support a means for receiving, from the UE, feedback pertaining to the multicast data message based on at least one of the multicast downlink shared channel or the unicast downlink shared channel and the second feedback process ID being associated with the first feedback process ID.

In some examples, the unicast manager 1230 may be configured as or otherwise support a means for transmitting the unicast downlink shared channel after a first scheduled feedback message corresponding to the multicast data message is scheduled to be transmitted, transmission of the unicast downlink shared channel being in accordance with a retransmission timing rule.

In some examples, the retransmission timing rule is indicative that the unicast downlink shared channel is to be transmitted after an end of the first scheduled feedback message based on the second feedback process ID being associated with the first feedback process ID.

In some examples, the unicast manager 1230 may be configured as or otherwise support a means for transmitting the unicast downlink shared channel before a first scheduled feedback message corresponding to the multicast data message is scheduled to be transmitted, transmission of the unicast downlink shared channel being in accordance with a retransmission timing rule.

In some examples, the retransmission timing rule specifies that the unicast downlink shared channel is receivable before the first scheduled feedback message, even when the second feedback process ID is associated with the first feedback process ID.

In some examples, to support receiving the feedback pertaining to at least one of the multicast downlink shared channel or the unicast downlink shared channel, the feedback manager 1240 may be configured as or otherwise support a means for receiving the feedback via either the first scheduled feedback message corresponding to the multicast data message or a second scheduled feedback message corresponding to the retransmission of the multicast data message.

In some examples, to support receiving the feedback via either the first scheduled feedback message or the second scheduled feedback message, the feedback manager 1240 may be configured as or otherwise support a means for receiving the feedback via the second scheduled feedback message and either not receiving the first scheduled feedback message or receiving the first scheduled feedback message with invalid feedback.

In some examples, to support transmitting the indication that the second feedback process ID is associated with the first feedback process ID, the feedback process ID manager 1235 may be configured as or otherwise support a means for transmitting the indication via either a radio resource control message, the first DCI message, the second DCI message, or a medium access control-control element.

In some examples, the retransmission of the multicast data message is scheduled to be transmitted without overlap of the multicast data message, in accordance with a scheduling rule that prohibits overlap of multiple downlink transmissions associated with a same feedback process ID.

In some examples, to support receiving the feedback pertaining to at least one of the multicast downlink shared channel or the unicast downlink shared channel, the feedback manager 1240 may be configured as or otherwise support a means for receiving the feedback via at least one of a first scheduled feedback message corresponding to the multicast data message or a second scheduled feedback message corresponding to the retransmission of the multicast data message, where the second scheduled feedback message is scheduled to be received after reception of the first scheduled feedback message in accordance with a scheduling rule that prohibits reception of the second scheduled feedback message prior to reception of the first scheduled feedback message.

In some examples, the retransmission of the multicast data message is scheduled to be transmitted after a last symbol of the multicast data message, in accordance with a scheduling rule that prohibits scheduling the retransmission of the multicast data message to begin prior to the last symbol of the multicast data message when the second DCI message is transmitted after the first DCI message.

In some examples, the retransmission of the multicast data message is scheduled to be transmitted at least a threshold number of symbols after a last symbol of a system information message, in accordance with a scheduling rule that prohibits scheduling a retransmission within less than the threshold number of symbols after the last symbol of the system information message. In some examples, the threshold number of symbols is based on a SCS configuration.

Additionally or alternatively, the communications manager 1220 may support wireless communications at a base station in accordance with examples as disclosed herein. In some examples, the multicast manager 1225 may be configured as or otherwise support a means for transmitting, to a UE, a first DCI message scheduling transmission of a multicast data message in a multicast downlink shared channel, the first DCI message also indicating a feedback process ID associated with the multicast data message. In some examples, the unicast manager 1230 may be configured as or otherwise support a means for transmitting a second DCI message scheduling a unicast downlink shared channel that includes a retransmission of the multicast data message, the second DCI message also indicating the feedback process ID as being associated with the unicast downlink shared channel. In some examples, the feedback manager 1240 may be configured as or otherwise support a means for receiving feedback pertaining to the multicast data message based on at least one of the multicast downlink shared channel or the unicast downlink shared channel and the feedback process ID being associated with both the multicast data message and the retransmission of the multicast data message.

In some examples, the unicast manager 1230 may be configured as or otherwise support a means for transmitting the unicast downlink shared channel after a first scheduled feedback message corresponding to the multicast data message is scheduled to be transmitted, the transmitting of the unicast downlink shared channel being in accordance with a retransmission timing rule.

In some examples, the retransmission timing rule is indicative that the unicast downlink shared channel is to be received after an end of the first scheduled feedback message based on the feedback process ID being associated with both the multicast data message and the retransmission of the multicast data message.

Figure 13:
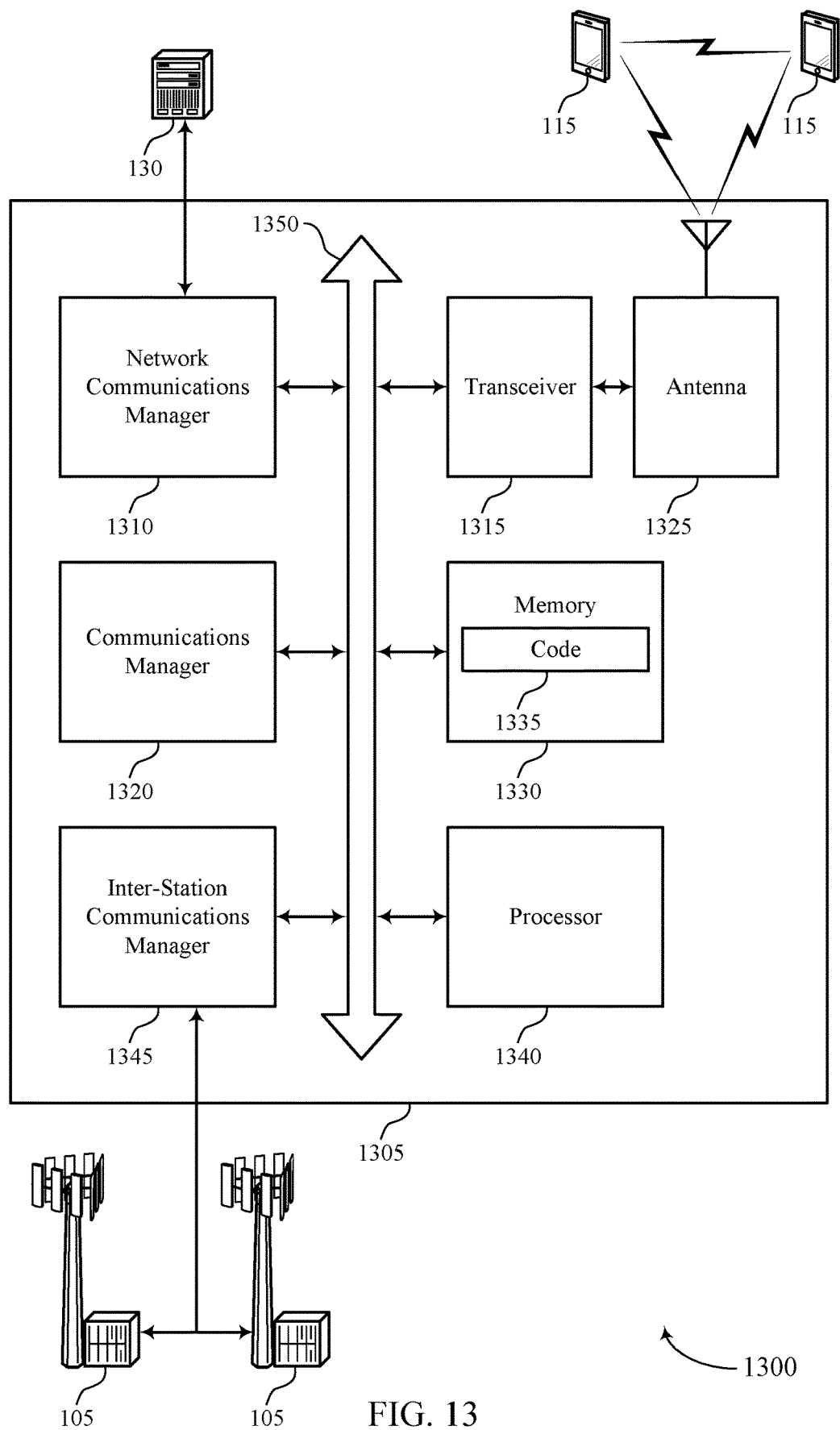
FIG. 13 shows a diagram of a system including a device that supports a feedback process in multicast retransmission in accordance with aspects of the present disclosure.

FIG. 13 shows a diagram of a system 1300 including a device 1305 that supports a feedback process in multicast retransmission in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting a feedback process in multicast retransmission). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, a first DCI message scheduling transmission of a multicast data message in a multicast downlink shared channel, the first DCI message also indicating a first feedback process ID associated with the multicast data message. The communications manager 1320 may be configured as or otherwise support a means for transmitting a second DCI message scheduling a unicast downlink shared channel that includes a retransmission of the multicast data message, the second DCI message also indicating a second feedback process ID to be associated with the unicast downlink shared channel and that is different from the first feedback process ID. The communications manager 1320 may be configured as or otherwise support a means for transmitting an indication that the second feedback process ID is associated with the first feedback process ID. The communications manager 1320 may be configured as or otherwise support a means for receiving, from the UE, feedback pertaining to the multicast data message based on at least one of the multicast downlink shared channel or the unicast downlink shared channel and the second feedback process ID being associated with the first feedback process ID.

Additionally or alternatively, the communications manager 1320 may support wireless communications at a base station in accordance with examples as disclosed herein. For example, the communications manager 1320 may be configured as or otherwise support a means for transmitting, to a UE, a first DCI message scheduling transmission of a multicast data message in a multicast downlink shared channel, the first DCI message also indicating a feedback process ID associated with the multicast data message. The communications manager 1320 may be configured as or otherwise support a means for transmitting a second DCI message scheduling a unicast downlink shared channel that includes a retransmission of the multicast data message, the second DCI message also indicating the feedback process ID as being associated with the unicast downlink shared channel. The communications manager 1320 may be configured as or otherwise support a means for receiving feedback pertaining to the multicast data message based on at least one of the multicast downlink shared channel or the unicast downlink shared channel and the feedback process ID being associated with both the multicast data message and the retransmission of the multicast data message.

By including or configuring the communications manager 1320 in accordance with examples as described herein, the device 1305 may support techniques for a base station to transmit a data message to one or more UEs in a multicast downlink shared channel according to a PTM transmission scheme and a data message retransmission based on a feedback process at the one or more UEs, which may improve communication reliability, reduce latency, improve user experience related to reduced processing, reduce power consumption, cause more efficient utilization of communication resources, improve coordination between devices, improve battery life, improve utilization of processing capability, and the like.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of a feedback process in multicast retransmission as described herein, or the processor 1340 and the memory 1330 may be otherwise configured to perform or support such operations.

Figure 14:
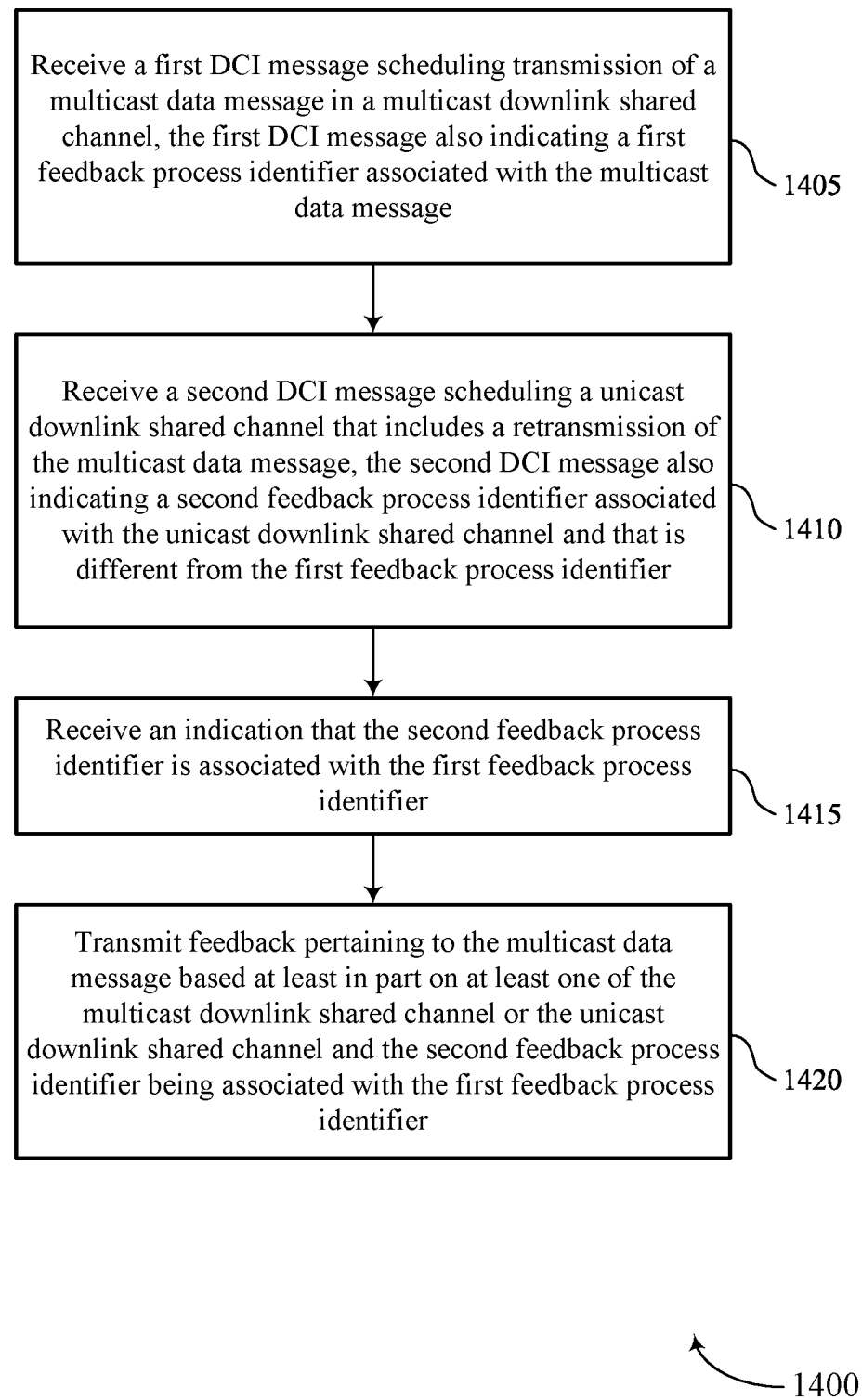
FIGS. 14 through 20 show flowcharts illustrating methods that support a feedback process in multicast retransmission in accordance with aspects of the present disclosure.

FIG. 14 shows a flowchart illustrating a method 1400 that supports a feedback process in multicast retransmission in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving a first DCI message scheduling transmission of a multicast data message in a multicast downlink shared channel, the first DCI message also indicating a first feedback process ID associated with the multicast data message. The operations of 1405 may be performed in accordance with examples as disclosed herein. In some examples, aspects of the operations of 1405 may be performed by a multicast component 825 as described with reference to FIG. 8.

At 1410, the method may include receiving a second DCI message scheduling a unicast downlink shared channel that includes a retransmission of the multicast data message, the second DCI message also indicating a second feedback process ID associated with the unicast downlink shared channel and that is different from the first feedback process ID. The operations of 1410 may be performed in accordance with examples as disclosed herein. In some examples, aspects of the operations of 1410 may be performed by a unicast component 830 as described with reference to FIG. 8.

At 1415, the method may include receiving an indication that the second feedback process ID is associated with the first feedback process ID. The operations of 1415 may be performed in accordance with examples as disclosed herein. In some examples, aspects of the operations of 1415 may be performed by a feedback process ID component 835 as described with reference to FIG. 8.

At 1420, the method may include transmitting feedback pertaining to the multicast data message based on at least one of the multicast downlink shared channel or the unicast downlink shared channel and the second feedback process ID being associated with the first feedback process ID. The operations of 1420 may be performed in accordance with examples as disclosed herein. In some examples, aspects of the operations of 1420 may be performed by a feedback component 840 as described with reference to FIG. 8.

Figure 15:
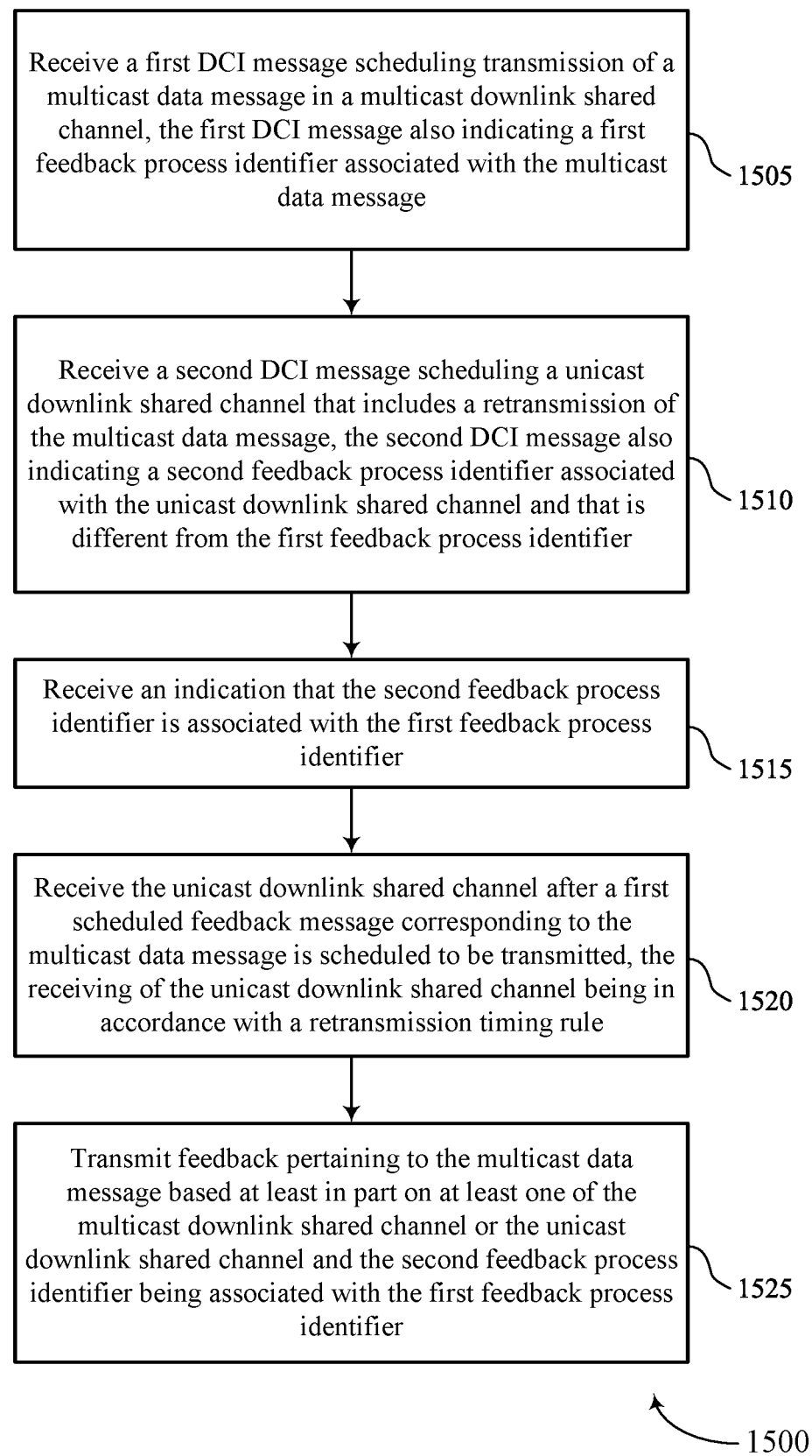

FIG. 15 shows a flowchart illustrating a method 1500 that supports a feedback process in multicast retransmission in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving a first DCI message scheduling transmission of a multicast data message in a multicast downlink shared channel, the first DCI message also indicating a first feedback process ID associated with the multicast data message. The operations of 1505 may be performed in accordance with examples as disclosed herein. In some examples, aspects of the operations of 1505 may be performed by a multicast component 825 as described with reference to FIG. 8.

At 1510, the method may include receiving a second DCI message scheduling a unicast downlink shared channel that includes a retransmission of the multicast data message, the second DCI message also indicating a second feedback process ID associated with the unicast downlink shared channel and that is different from the first feedback process ID. The operations of 1510 may be performed in accordance with examples as disclosed herein. In some examples, aspects of the operations of 1510 may be performed by a unicast component 830 as described with reference to FIG. 8.

At 1515, the method may include receiving an indication that the second feedback process ID is associated with the first feedback process ID. The operations of 1515 may be performed in accordance with examples as disclosed herein. In some examples, aspects of the operations of 1515 may be performed by a feedback process ID component 835 as described with reference to FIG. 8.

At 1520, the method may include receiving the unicast downlink shared channel after a first scheduled feedback message corresponding to the multicast data message is scheduled to be transmitted, the receiving of the unicast downlink shared channel being in accordance with a retransmission timing rule. The operations of 1520 may be performed in accordance with examples as disclosed herein. In some examples, aspects of the operations of 1520 may be performed by a unicast component 830 as described with reference to FIG. 8.

At 1525, the method may include transmitting feedback pertaining to the multicast data message based on at least one of the multicast downlink shared channel or the unicast downlink shared channel and the second feedback process ID being associated with the first feedback process ID. The operations of 1525 may be performed in accordance with examples as disclosed herein. In some examples, aspects of the operations of 1525 may be performed by a feedback component 840 as described with reference to FIG. 8.

Figure 16:
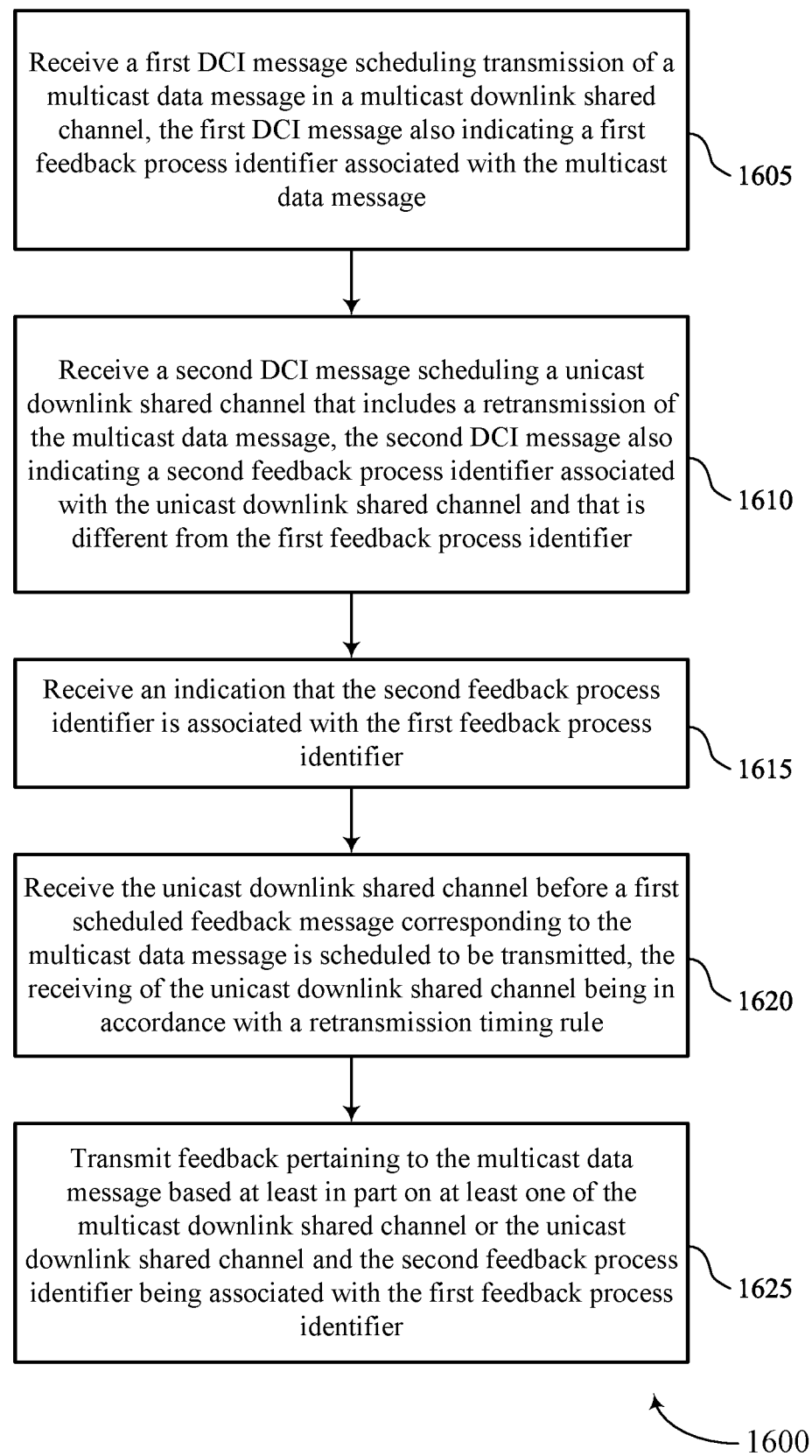

FIG. 16 shows a flowchart illustrating a method 1600 that supports a feedback process in multicast retransmission in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving a first DCI message scheduling transmission of a multicast data message in a multicast downlink shared channel, the first DCI message also indicating a first feedback process ID associated with the multicast data message. The operations of 1605 may be performed in accordance with examples as disclosed herein. In some examples, aspects of the operations of 1605 may be performed by a multicast component 825 as described with reference to FIG. 8.

At 1610, the method may include receiving a second DCI message scheduling a unicast downlink shared channel that includes a retransmission of the multicast data message, the second DCI message also indicating a second feedback process ID associated with the unicast downlink shared channel and that is different from the first feedback process ID. The operations of 1610 may be performed in accordance with examples as disclosed herein. In some examples, aspects of the operations of 1610 may be performed by a unicast component 830 as described with reference to FIG. 8.

At 1615, the method may include receiving an indication that the second feedback process ID is associated with the first feedback process ID. The operations of 1615 may be performed in accordance with examples as disclosed herein. In some examples, aspects of the operations of 1615 may be performed by a feedback process ID component 835 as described with reference to FIG. 8.

At 1620, the method may include receiving the unicast downlink shared channel before a first scheduled feedback message corresponding to the multicast data message is scheduled to be transmitted, the receiving of the unicast downlink shared channel being in accordance with a retransmission timing rule. The operations of 1620 may be performed in accordance with examples as disclosed herein. In some examples, aspects of the operations of 1620 may be performed by a unicast component 830 as described with reference to FIG. 8.

At 1625, the method may include transmitting feedback pertaining to the multicast data message based on at least one of the multicast downlink shared channel or the unicast downlink shared channel and the second feedback process ID being associated with the first feedback process ID. The operations of 1625 may be performed in accordance with examples as disclosed herein. In some examples, aspects of the operations of 1625 may be performed by a feedback component 840 as described with reference to FIG. 8.

Figure 17:
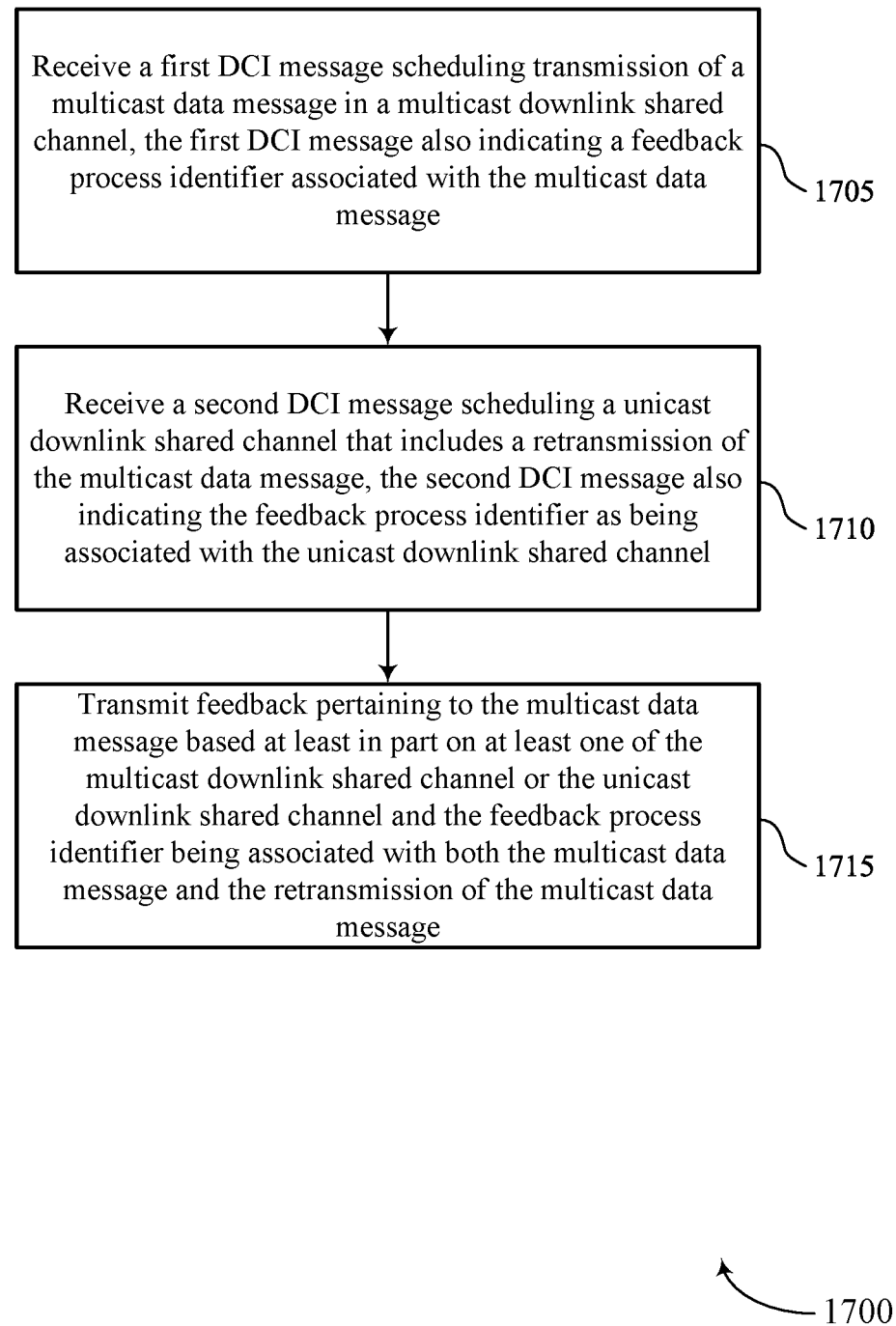

FIG. 17 shows a flowchart illustrating a method 1700 that supports a feedback process in multicast retransmission in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving a first DCI message scheduling transmission of a multicast data message in a multicast downlink shared channel, the first DCI message also indicating a feedback process ID associated with the multicast data message. The operations of 1705 may be performed in accordance with examples as disclosed herein. In some examples, aspects of the operations of 1705 may be performed by a multicast component 825 as described with reference to FIG. 8.

At 1710, the method may include receiving a second DCI message scheduling a unicast downlink shared channel that includes a retransmission of the multicast data message, the second DCI message also indicating the feedback process ID as being associated with the unicast downlink shared channel. The operations of 1710 may be performed in accordance with examples as disclosed herein. In some examples, aspects of the operations of 1710 may be performed by a unicast component 830 as described with reference to FIG. 8.

At 1715, the method may include transmitting feedback pertaining to the multicast data message based on at least one of the multicast downlink shared channel or the unicast downlink shared channel and the feedback process ID being associated with both the multicast data message and the retransmission of the multicast data message. The operations of 1715 may be performed in accordance with examples as disclosed herein. In some examples, aspects of the operations of 1715 may be performed by a feedback component 840 as described with reference to FIG. 8.

Figure 18:
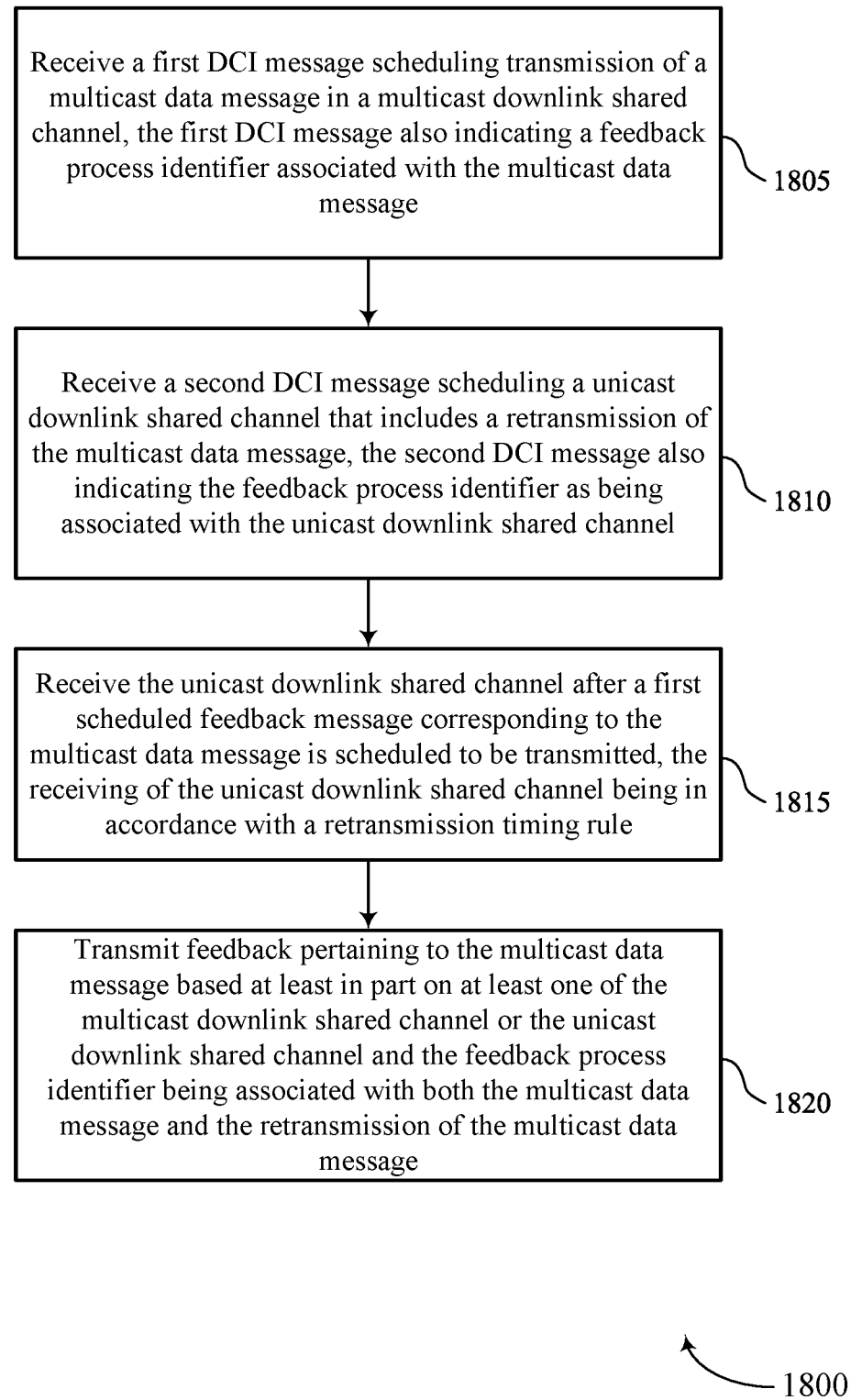

FIG. 18 shows a flowchart illustrating a method 1800 that supports a feedback process in multicast retransmission in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving a first DCI message scheduling transmission of a multicast data message in a multicast downlink shared channel, the first DCI message also indicating a feedback process ID associated with the multicast data message. The operations of 1805 may be performed in accordance with examples as disclosed herein. In some examples, aspects of the operations of 1805 may be performed by a multicast component 825 as described with reference to FIG. 8.

At 1810, the method may include receiving a second DCI message scheduling a unicast downlink shared channel that includes a retransmission of the multicast data message, the second DCI message also indicating the feedback process ID as being associated with the unicast downlink shared channel. The operations of 1810 may be performed in accordance with examples as disclosed herein. In some examples, aspects of the operations of 1810 may be performed by a unicast component 830 as described with reference to FIG. 8.

At 1815, the method may include receiving the unicast downlink shared channel after a first scheduled feedback message corresponding to the multicast data message is scheduled to be transmitted, the receiving of the unicast downlink shared channel being in accordance with a retransmission timing rule. The operations of 1815 may be performed in accordance with examples as disclosed herein. In some examples, aspects of the operations of 1815 may be performed by a unicast component 830 as described with reference to FIG. 8.

At 1820, the method may include transmitting feedback pertaining to the multicast data message based on at least one of the multicast downlink shared channel or the unicast downlink shared channel and the feedback process ID being associated with both the multicast data message and the retransmission of the multicast data message. The operations of 1820 may be performed in accordance with examples as disclosed herein. In some examples, aspects of the operations of 1820 may be performed by a feedback component 840 as described with reference to FIG. 8.

Figure 19:
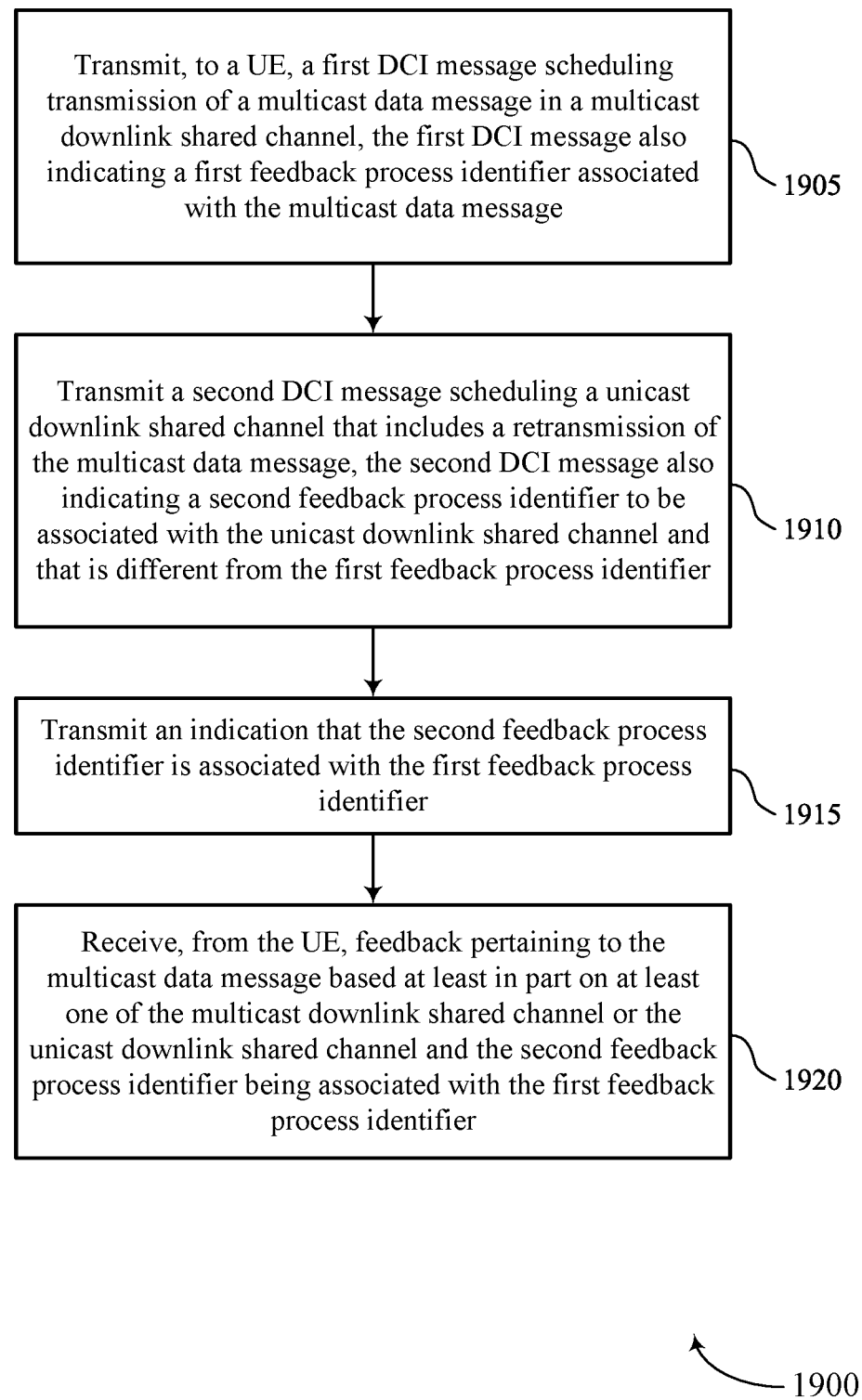

FIG. 19 shows a flowchart illustrating a method 1900 that supports a feedback process in multicast retransmission in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, a first DCI message scheduling transmission of a multicast data message in a multicast downlink shared channel, the first DCI message also indicating a first feedback process ID associated with the multicast data message. The operations of 1905 may be performed in accordance with examples as disclosed herein. In some examples, aspects of the operations of 1905 may be performed by a multicast manager 1225 as described with reference to FIG. 12.

At 1910, the method may include transmitting a second DCI message scheduling a unicast downlink shared channel that includes a retransmission of the multicast data message, the second DCI message also indicating a second feedback process ID to be associated with the unicast downlink shared channel and that is different from the first feedback process ID. The operations of 1910 may be performed in accordance with examples as disclosed herein. In some examples, aspects of the operations of 1910 may be performed by a unicast manager 1230 as described with reference to FIG. 12.

At 1915, the method may include transmitting an indication that the second feedback process ID is associated with the first feedback process ID. The operations of 1915 may be performed in accordance with examples as disclosed herein. In some examples, aspects of the operations of 1915 may be performed by a feedback process ID manager 1235 as described with reference to FIG. 12.

At 1920, the method may include receiving, from the UE, feedback pertaining to the multicast data message based on at least one of the multicast downlink shared channel or the unicast downlink shared channel and the second feedback process ID being associated with the first feedback process ID. The operations of 1920 may be performed in accordance with examples as disclosed herein. In some examples, aspects of the operations of 1920 may be performed by a feedback manager 1240 as described with reference to FIG. 12.

Figure 20:
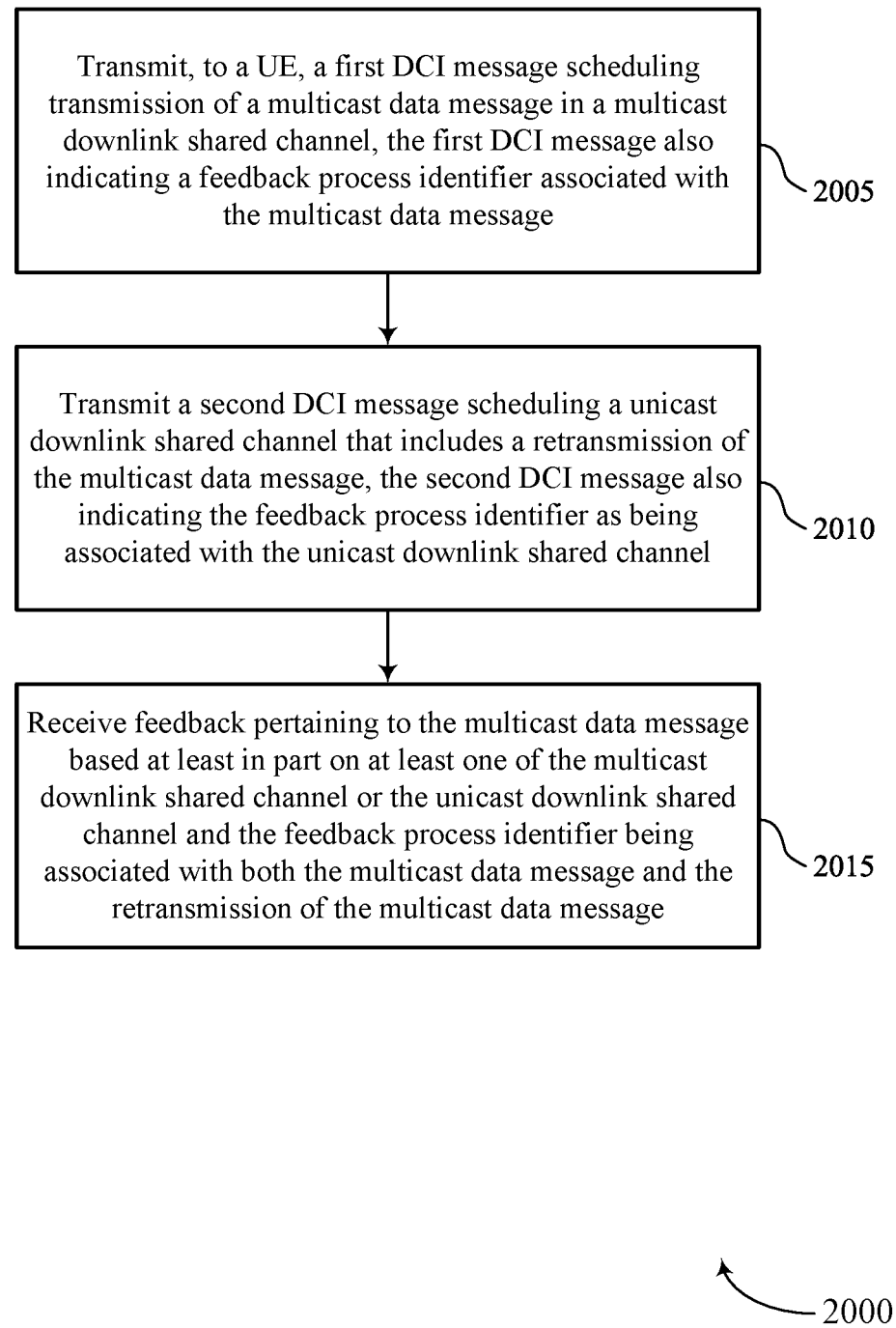

FIG. 20 shows a flowchart illustrating a method 2000 that supports a feedback process in multicast retransmission in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, a first DCI message scheduling transmission of a multicast data message in a multicast downlink shared channel, the first DCI message also indicating a feedback process ID associated with the multicast data message. The operations of 2005 may be performed in accordance with examples as disclosed herein. In some examples, aspects of the operations of 2005 may be performed by a multicast manager 1225 as described with reference to FIG. 12.

At 2010, the method may include transmitting a second DCI message scheduling a unicast downlink shared channel that includes a retransmission of the multicast data message, the second DCI message also indicating the feedback process ID as being associated with the unicast downlink shared channel. The operations of 2010 may be performed in accordance with examples as disclosed herein. In some examples, aspects of the operations of 2010 may be performed by a unicast manager 1230 as described with reference to FIG. 12.

At 2015, the method may include receiving feedback pertaining to the multicast data message based on at least one of the multicast downlink shared channel or the unicast downlink shared channel and the feedback process ID being associated with both the multicast data message and the retransmission of the multicast data message. The operations of 2015 may be performed in accordance with examples as disclosed herein. In some examples, aspects of the operations of 2015 may be performed by a feedback manager 1240 as described with reference to FIG. 12.

The following provides an overview of aspects of the present disclosure:

Aspect 1: A method for wireless communications at a UE, comprising: receiving a first downlink control information message scheduling transmission of a multicast data message in a multicast downlink shared channel, the first downlink control information message also indicating a first feedback process identifier associated with the multicast data message; receiving a second downlink control information message scheduling a unicast downlink shared channel that includes a retransmission of the multicast data message, the second downlink control information message also indicating a second feedback process identifier associated with the unicast downlink shared channel and that is different from the first feedback process identifier; receiving an indication that the second feedback process identifier is associated with the first feedback process identifier; and transmitting feedback pertaining to the multicast data message based at least in part on at least one of the multicast downlink shared channel or the unicast downlink shared channel and the second feedback process identifier being associated with the first feedback process identifier.

Aspect 2: The method of aspect 1, further comprising: receiving the unicast downlink shared channel after a first scheduled feedback message corresponding to the multicast data message is scheduled to be transmitted, the receiving of the unicast downlink shared channel being in accordance with a retransmission timing rule.

Aspect 3: The method of aspect 2, wherein the retransmission timing rule is indicative that the unicast downlink shared channel is to be received after an end of the first scheduled feedback message based at least in part on the second feedback process identifier being associated with the first feedback process identifier.

Aspect 4: The method of aspect 1, further comprising: receiving the unicast downlink shared channel before a first scheduled feedback message corresponding to the multicast data message is scheduled to be transmitted, the receiving of the unicast downlink shared channel being in accordance with a retransmission timing rule.

Aspect 5: The method of aspect 4, wherein the retransmission timing rule specifies that the unicast downlink shared channel is receivable before the first scheduled feedback message, even when the second feedback process identifier is associated with the first feedback process identifier.

Aspect 6: The method of any of aspects 4 through 5, further comprising: decoding either the multicast data message or the retransmission of the multicast data message without soft-combining decoding results from the multicast data message and the retransmission of the multicast data message, wherein transmitting the feedback is based on decoding only one of the multicast data message or the retransmission of the multicast data message.

Aspect 7: The method of aspect 6, wherein transmitting the feedback pertaining to at least one of the multicast downlink shared channel or the unicast downlink shared channel further comprises: transmitting the feedback via either the first scheduled feedback message corresponding to the multicast data message or a second scheduled feedback message corresponding to the retransmission of the multicast data message.

Aspect 8: The method of aspect 7, wherein transmitting the feedback via either the first scheduled feedback message or the second scheduled feedback message further comprises: transmitting the feedback via the second scheduled feedback message and either not transmitting the first scheduled feedback message or transmitting the first scheduled feedback message with invalid feedback.

Aspect 9: The method of any of aspects 1 through 8, wherein receiving the indication that the second feedback process identifier is associated with the first feedback process identifier comprises: receiving the indication via either a radio resource control message, the first downlink control information message, the second downlink control information message, or a medium access control-control element.

Aspect 10: The method of any of aspects 1 through 9, wherein the unicast downlink shared channel is scheduled to be received without overlap of the multicast downlink shared channel, in accordance with a scheduling rule that prohibits overlap of multiple downlink transmissions associated with a same feedback process identifier.

Aspect 11: The method of any of aspects 1 through 10, wherein transmitting the feedback pertaining to at least one of the multicast downlink shared channel or the unicast downlink shared channel further comprises: transmitting the feedback via at least one of a first scheduled feedback message corresponding to the multicast data message or a second scheduled feedback message corresponding to the retransmission of the multicast data message, wherein the second scheduled feedback message is scheduled to be transmitted after transmission of the first scheduled feedback message in accordance with a scheduling rule that prohibits transmission of the second scheduled feedback message prior to transmission of the first scheduled feedback message.

Aspect 12: The method of any of aspects 1 through 11, wherein the retransmission of the multicast data message is scheduled to be received after a last symbol of the multicast data message, in accordance with a scheduling rule that prohibits scheduling the retransmission of the multicast data message to begin prior to the last symbol of the multicast data message when the second downlink control information message is received after the first downlink control information message.

Aspect 13: The method of any of aspects 1 through 12, wherein the retransmission of the multicast data message is scheduled to be received at least a threshold number of symbols after a last symbol of a system information message, in accordance with a scheduling rule that prohibits scheduling a retransmission within less than the threshold number of symbols after the last symbol of the system information message, the threshold number of symbols is based at least in part on a subcarrier spacing configuration.

Aspect 14: A method for wireless communications at a UE, comprising: receiving a first downlink control information message scheduling transmission of a multicast data message in a multicast downlink shared channel, the first downlink control information message also indicating a feedback process identifier associated with the multicast data message; receiving a second downlink control information message scheduling a unicast downlink shared channel that includes a retransmission of the multicast data message, the second downlink control information message also indicating the feedback process identifier as being associated with the unicast downlink shared channel; and transmitting feedback pertaining to the multicast data message based at least in part on at least one of the multicast downlink shared channel or the unicast downlink shared channel and the feedback process identifier being associated with both the multicast data message and the retransmission of the multicast data message.

Aspect 15: The method of aspect 14, further comprising: receiving the unicast downlink shared channel after a first scheduled feedback message corresponding to the multicast data message is scheduled to be transmitted, the receiving of the unicast downlink shared channel being in accordance with a retransmission timing rule.

Aspect 16: The method of aspect 15, wherein the retransmission timing rule is indicative that the unicast downlink shared channel is to be received after the first scheduled feedback message based at least in part on the feedback process identifier being associated with both the multicast downlink shared channel and the unicast downlink shared channel.

Aspect 17: A method for wireless communications at a base station, comprising: transmitting, to a UE, a first downlink control information message scheduling transmission of a multicast data message in a multicast downlink shared channel, the first downlink control information message also indicating a first feedback process identifier associated with the multicast data message; transmitting a second downlink control information message scheduling a unicast downlink shared channel that includes a retransmission of the multicast data message, the second downlink control information message also indicating a second feedback process identifier to be associated with the unicast downlink shared channel and that is different from the first feedback process identifier; transmitting an indication that the second feedback process identifier is associated with the first feedback process identifier; and receiving, from the UE, feedback pertaining to the multicast data message based at least in part on at least one of the multicast downlink shared channel or the unicast downlink shared channel and the second feedback process identifier being associated with the first feedback process identifier.

Aspect 18: The method of aspect 17, further comprising: transmitting the unicast downlink shared channel after a first scheduled feedback message corresponding to the multicast data message is scheduled to be transmitted, transmission of the unicast downlink shared channel being in accordance with a retransmission timing rule.

Aspect 19: The method of aspect 18, wherein the retransmission timing rule is indicative that the unicast downlink shared channel is to be transmitted after an end of the first scheduled feedback message based at least in part on the second feedback process identifier being associated with the first feedback process identifier.

Aspect 20: The method of aspect 17, further comprising: transmitting the unicast downlink shared channel before a first scheduled feedback message corresponding to the multicast data message is scheduled to be transmitted, transmission of the unicast downlink shared channel being in accordance with a retransmission timing rule.

Aspect 21: The method of aspect 20, wherein the retransmission timing rule specifies that the unicast downlink shared channel is receivable before the first scheduled feedback message, even when the second feedback process identifier is associated with the first feedback process identifier.

Aspect 22: The method of any of aspects 20 through 21, wherein receiving the feedback pertaining to at least one of the multicast downlink shared channel or the unicast downlink shared channel further comprises: receiving the feedback via either the first scheduled feedback message corresponding to the multicast data message or a second scheduled feedback message corresponding to the retransmission of the multicast data message.

Aspect 23: The method of aspect 22, wherein receiving the feedback via either the first scheduled feedback message or the second scheduled feedback message further comprises: receiving the feedback via the second scheduled feedback message and either not receiving the first scheduled feedback message or receiving the first scheduled feedback message with invalid feedback.

Aspect 24: The method of any of aspects 17 through 23, wherein transmitting the indication that the second feedback process identifier is associated with the first feedback process identifier comprises: transmitting the indication via either a radio resource control message, the first downlink control information message, the second downlink control information message, or a medium access control-control element.

Aspect 25: The method of any of aspects 17 through 24, wherein the retransmission of the multicast data message is scheduled to be transmitted without overlap of the multicast data message, in accordance with a scheduling rule that prohibits overlap of multiple downlink transmissions associated with a same feedback process identifier.

Aspect 26: The method of any of aspects 17 through 25, wherein receiving the feedback pertaining to at least one of the multicast downlink shared channel or the unicast downlink shared channel further comprises: receiving the feedback via at least one of a first scheduled feedback message corresponding to the multicast data message or a second scheduled feedback message corresponding to the retransmission of the multicast data message, wherein the second scheduled feedback message is scheduled to be received after reception of the first scheduled feedback message in accordance with a scheduling rule that prohibits reception of the second scheduled feedback message prior to reception of the first scheduled feedback message.

Aspect 27: The method of any of aspects 17 through 26, wherein the retransmission of the multicast data message is scheduled to be transmitted after a last symbol of the multicast data message, in accordance with a scheduling rule that prohibits scheduling the retransmission of the multicast data message to begin prior to the last symbol of the multicast data message when the second downlink control information message is transmitted after the first downlink control information message.

Aspect 28: The method of any of aspects 17 through 27, wherein the retransmission of the multicast data message is scheduled to be transmitted at least a threshold number of symbols after a last symbol of a system information message, in accordance with a scheduling rule that prohibits scheduling a retransmission within less than the threshold number of symbols after the last symbol of the system information message, the threshold number of symbols is based at least in part on a subcarrier spacing configuration.

Aspect 29: A method for wireless communications at a base station, comprising: transmitting, to a UE, a first downlink control information message scheduling transmission of a multicast data message in a multicast downlink shared channel, the first downlink control information message also indicating a feedback process identifier associated with the multicast data message; transmitting a second downlink control information message scheduling a unicast downlink shared channel that includes a retransmission of the multicast data message, the second downlink control information message also indicating the feedback process identifier as being associated with the unicast downlink shared channel; and receiving feedback pertaining to the multicast data message based at least in part on at least one of the multicast downlink shared channel or the unicast downlink shared channel and the feedback process identifier being associated with both the multicast data message and the retransmission of the multicast data message.

Aspect 30: The method of aspect 29, further comprising: transmitting the unicast downlink shared channel after a first scheduled feedback message corresponding to the multicast data message is scheduled to be transmitted, the transmitting of the unicast downlink shared channel being in accordance with a retransmission timing rule.

Aspect 31: The method of aspect 30, wherein the retransmission timing rule is indicative that the unicast downlink shared channel is to be received after an end of the first scheduled feedback message based at least in part on the feedback process identifier being associated with both the multicast data message and the retransmission of the multicast data message.

Aspect 32: An apparatus for wireless communications, comprising a processor; memory coupled with the processor; and instructions stored in the memory and executable by the processor to cause the apparatus to perform a method of any of aspects 1 through 13.

Aspect 33: An apparatus for wireless communications, comprising at least one means for performing a method of any of aspects 1 through 13.

Aspect 34: A non-transitory computer-readable medium storing code for wireless communications at a UE, the code comprising instructions executable by a processor to perform a method of any of aspects 1 through 13.

Aspect 35: An apparatus for wireless communications, comprising a processor; memory coupled with the processor; and instructions stored in the memory and executable by the processor to cause the apparatus to perform a method of any of aspects 14 through 16.

Aspect 36: An apparatus for wireless communications, comprising at least one means for performing a method of any of aspects 14 through 16.

Aspect 37: A non-transitory computer-readable medium storing code for wireless communications at a UE, the code comprising instructions executable by a processor to perform a method of any of aspects 14 through 16.

Aspect 38: An apparatus for wireless communications, comprising a processor; memory coupled with the processor; and instructions stored in the memory and executable by the processor to cause the apparatus to perform a method of any of aspects 17 through 28.

Aspect 39: An apparatus for wireless communications, comprising at least one means for performing a method of any of aspects 17 through 28.

Aspect 40: A non-transitory computer-readable medium storing code for wireless communications at a base station, the code comprising instructions executable by a processor to perform a method of any of aspects 17 through 28.

Aspect 41: An apparatus for wireless communications, comprising a processor; memory coupled with the processor; and instructions stored in the memory and executable by the processor to cause the apparatus to perform a method of any of aspects 29 through 31.

Aspect 42: An apparatus for wireless communications, comprising at least one means for performing a method of any of aspects 29 through 31.

Aspect 43: A non-transitory computer-readable medium storing code for wireless communications at a base station, the code comprising instructions executable by a processor to perform a method of any of aspects 29 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a first downlink control information message scheduling transmission of a multicast data message in a multicast downlink shared channel, the first downlink control information message also indicating a first feedback process identifier associated with the multicast data message;

receiving a second downlink control information message scheduling a unicast downlink shared channel that includes a retransmission of the multicast data message, the second downlink control information message also indicating a second feedback process identifier associated with the unicast downlink shared channel and that is different from the first feedback process identifier;

receiving an indication that the second feedback process identifier is associated with the first feedback process identifier; and transmitting feedback pertaining to the multicast data message based at least in part on at least one of the multicast downlink shared channel or the unicast downlink shared channel and the second feedback process identifier being associated with the first feedback process identifier.

2. The method of claim 1, further comprising:
receiving the unicast downlink shared channel after a first scheduled feedback message corresponding to the multicast data message is scheduled to be transmitted, the receiving of the unicast downlink shared channel being in accordance with a retransmission timing rule.

3. The method of claim 2, wherein the retransmission timing rule is indicative that the unicast downlink shared channel is to be received after an end of the first scheduled feedback message based at least in part on the second feedback process identifier being associated with the first feedback process identifier.

4. The method of claim 1, further comprising:
receiving the unicast downlink shared channel before a first scheduled feedback message corresponding to the multicast data message is scheduled to be transmitted, the receiving of the unicast downlink shared channel being in accordance with a retransmission timing rule.

5. The method of claim 4, wherein the retransmission timing rule specifies that the unicast downlink shared channel is receivable before the first scheduled feedback message, even when the second feedback process identifier is associated with the first feedback process identifier.

6. The method of claim 4, further comprising:
decoding either the multicast data message or the retransmission of the multicast data message without soft-combining decoding results from the multicast data message and the retransmission of the multicast data message, wherein transmitting the feedback is based on decoding only one of the multicast data message or the retransmission of the multicast data message.

7. The method of claim 6, wherein transmitting the feedback pertaining to at least one of the multicast downlink shared channel or the unicast downlink shared channel further comprises:
transmitting the feedback via either the first scheduled feedback message corresponding to the multicast data message or a second scheduled feedback message corresponding to the retransmission of the multicast data message.

8. The method of claim 7, wherein transmitting the feedback via either the first scheduled feedback message or the second scheduled feedback message further comprises:
transmitting the feedback via the second scheduled feedback message and either not transmitting the first scheduled feedback message or transmitting the first scheduled feedback message with invalid feedback.

9. The method of claim 1, wherein receiving the indication that the second feedback process identifier is associated with the first feedback process identifier comprises:
receiving the indication via either a radio resource control message, the first downlink control information message, the second downlink control information message, or a medium access control-control element.

10. The method of claim 1, wherein the unicast downlink shared channel is scheduled to be received without overlap of the multicast downlink shared channel, in accordance with a scheduling rule that prohibits overlap of multiple downlink transmissions associated with a same feedback process identifier.

11. The method of claim 1, wherein transmitting the feedback pertaining to at least one of the multicast downlink shared channel or the unicast downlink shared channel further comprises:
transmitting the feedback via at least one of a first scheduled feedback message corresponding to the multicast data message or a second scheduled feedback message corresponding to the retransmission of the multicast data message, wherein the second scheduled feedback message is scheduled to be transmitted after transmission of the first scheduled feedback message in accordance with a scheduling rule that prohibits transmission of the second scheduled feedback message prior to transmission of the first scheduled feedback message.

12. The method of claim 1, wherein the retransmission of the multicast data message is scheduled to be received after a last symbol of the multicast data message, in accordance with a scheduling rule that prohibits scheduling the retransmission of the multicast data message to begin prior to the last symbol of the multicast data message when the second downlink control information message is received after the first downlink control information message.

13. The method of claim 1, wherein
the retransmission of the multicast data message is scheduled to be received at least a threshold number of symbols after a last symbol of a system information message, in accordance with a scheduling rule that prohibits scheduling a retransmission within less than the threshold number of symbols after the last symbol of the system information message,
the threshold number of symbols is based at least in part on a subcarrier spacing configuration.

14. A method for wireless communications at a user equipment (UE), comprising:
receiving a first downlink control information message scheduling transmission of a multicast data message in a multicast downlink shared channel, the first downlink control information message also indicating a feedback process identifier associated with the multicast data message;

receiving a second downlink control information message scheduling a unicast downlink shared channel that includes a retransmission of the multicast data message, the second downlink control information message also indicating the feedback process identifier as being associated with the unicast downlink shared channel; and transmitting feedback pertaining to the multicast data message based at least in part on at least one of the multicast downlink shared channel or the unicast downlink shared channel and the feedback process identifier being associated with both the multicast data message and the retransmission of the multicast data message.

15. The method of claim 14, further comprising:
receiving the unicast downlink shared channel after a first scheduled feedback message corresponding to the multicast data message is scheduled to be transmitted, the receiving of the unicast downlink shared channel being in accordance with a retransmission timing rule.

16. The method of claim 15, wherein the retransmission timing rule is indicative that the unicast downlink shared channel is to be received after the first scheduled feedback message based at least in part on the feedback process identifier being associated with both the multicast downlink shared channel and the unicast downlink shared channel.

17. A method for wireless communications at a base station, comprising:
transmitting, to a user equipment (UE), a first downlink control information message scheduling transmission of a multicast data message in a multicast downlink shared channel, the first downlink control information message also indicating a first feedback process identifier associated with the multicast data message;
transmitting a second downlink control information message scheduling a unicast downlink shared channel that includes a retransmission of the multicast data message, the second downlink control information message also indicating a second feedback process identifier to be associated with the unicast downlink shared channel and that is different from the first feedback process identifier;
transmitting an indication that the second feedback process identifier is associated with the first feedback process identifier; and
receiving, from the UE, feedback pertaining to the multicast data message based at least in part on at least one of the multicast downlink shared channel or the unicast downlink shared channel and the second feedback process identifier being associated with the first feedback process identifier.

18. The method of claim 17, further comprising:
transmitting the unicast downlink shared channel after a first scheduled feedback message corresponding to the multicast data message is scheduled to be transmitted, transmission of the unicast downlink shared channel being in accordance with a retransmission timing rule.

19. The method of claim 18, wherein the retransmission timing rule is indicative that the unicast downlink shared channel is to be transmitted after an end of the first scheduled feedback message based at least in part on the second feedback process identifier being associated with the first feedback process identifier.

20. The method of claim 17, further comprising:
transmitting the unicast downlink shared channel before a first scheduled feedback message corresponding to the multicast data message is scheduled to be transmitted, transmission of the unicast downlink shared channel being in accordance with a retransmission timing rule.

21. The method of claim 20, wherein the retransmission timing rule specifies that the unicast downlink shared channel is receivable before the first scheduled feedback message, even when the second feedback process identifier is associated with the first feedback process identifier.

22. The method of claim 20, wherein receiving the feedback pertaining to at least one of the multicast downlink shared channel or the unicast downlink shared channel further comprises:
receiving the feedback via either the first scheduled feedback message corresponding to the multicast data message or a second scheduled feedback message corresponding to the retransmission of the multicast data message.

23. The method of claim 22, wherein receiving the feedback via either the first scheduled feedback message or the second scheduled feedback message further comprises:
receiving the feedback via the second scheduled feedback message and either not receiving the first scheduled feedback message or receiving the first scheduled feedback message with invalid feedback.

24. The method of claim 17, wherein transmitting the indication that the second feedback process identifier is associated with the first feedback process identifier comprises:
transmitting the indication via either a radio resource control message, the first downlink control information message, the second downlink control information message, or a medium access control-control element.

25. The method of claim 17, wherein the retransmission of the multicast data message is scheduled to be transmitted without overlap of the multicast data message, in accordance with a scheduling rule that prohibits overlap of multiple downlink transmissions associated with a same feedback process identifier.

26. The method of claim 17, wherein receiving the feedback pertaining to at least one of the multicast downlink shared channel or the unicast downlink shared channel further comprises:
receiving the feedback via at least one of a first scheduled feedback message corresponding to the multicast data message or a second scheduled feedback message corresponding to the retransmission of the multicast data message, wherein the second scheduled feedback message is scheduled to be received after reception of the first scheduled feedback message in accordance with a scheduling rule that prohibits reception of the second scheduled feedback message prior to reception of the first scheduled feedback message.

27. The method of claim 17, wherein the retransmission of the multicast data message is scheduled to be transmitted after a last symbol of the multicast data message, in accordance with a scheduling rule that prohibits scheduling the retransmission of the multicast data message to begin prior to the last symbol of the multicast data message when the second downlink control information message is transmitted after the first downlink control information message.

28. The method of claim 17, wherein
the retransmission of the multicast data message is scheduled to be transmitted at least a threshold number of symbols after a last symbol of a system information message, in accordance with a scheduling rule that prohibits scheduling a retransmission within less than the threshold number of symbols after the last symbol of the system information message,
the threshold number of symbols is based at least in part on a subcarrier spacing configuration.

29. A method for wireless communications at a base station, comprising:
transmitting, to a user equipment (UE), a first downlink control information message scheduling transmission of a multicast data message in a multicast downlink shared channel, the first downlink control information message also indicating a feedback process identifier associated with the multicast data message;
transmitting a second downlink control information message scheduling a unicast downlink shared channel that includes a retransmission of the multicast data message, the second downlink control information message also indicating the feedback process identifier as being associated with the unicast downlink shared channel; and receiving feedback pertaining to the multicast data message based at least in part on at least one of the multicast downlink shared channel or the unicast downlink shared channel and the feedback process identifier being associated with both the multicast data message and the retransmission of the multicast data message.

30. The method of claim 29, further comprising:
transmitting the unicast downlink shared channel after a first scheduled feedback message corresponding to the multicast data message is scheduled to be transmitted, the transmitting of the unicast downlink shared channel being in accordance with a retransmission timing rule.

31. The method of claim 14, further comprising:
decoding either the multicast data message or the retransmission of the multicast data message without soft-combining decoding results from the multicast data message and the retransmission of the multicast data message, wherein transmitting the feedback is based on decoding only one of the multicast data message or the retransmission of the multicast data message.

32. The method of claim 14, wherein the unicast downlink shared channel is scheduled to be received without overlap of the multicast downlink shared channel, in accordance with a scheduling rule that prohibits overlap of multiple downlink transmissions associated with a same feedback process identifier.

33. The method of claim 14, wherein transmitting the feedback pertaining to the multicast data message further comprises:
transmitting the feedback via at least one of a first scheduled feedback message corresponding to the multicast data message or a second scheduled feedback message corresponding to the retransmission of the multicast data message, wherein the second scheduled feedback message is scheduled to be transmitted after transmission of the first scheduled feedback message in accordance with a scheduling rule that prohibits transmission of the second scheduled feedback message prior to transmission of the first scheduled feedback message.

34. The method of claim 14, wherein the retransmission of the multicast data message is scheduled to be received after a last symbol of the multicast data message, in accordance with a scheduling rule that prohibits scheduling the retransmission of the multicast data message to begin prior to the last symbol of the multicast data message when the second downlink control information message is received after the first downlink control information message.

35. The method of claim 14, wherein
the retransmission of the multicast data message is scheduled to be received at least a threshold number of symbols after a last symbol of a system information message, in accordance with a scheduling rule that prohibits scheduling a retransmission within less than the threshold number of symbols after the last symbol of the system information message, and
the threshold number of symbols is based at least in part on a subcarrier spacing configuration.

36. An apparatus for wireless communications at a user equipment (UE), comprising:
a processor;
memory in communication with the processor; and
instructions stored in the memory, the instructions being executable by the processor to:
receive a first downlink control information message scheduling transmission of a multicast data message in a multicast downlink shared channel, the first downlink control information message also indicating a feedback process identifier associated with the multicast data message;
receive a second downlink control information message scheduling a unicast downlink shared channel that includes a retransmission of the multicast data message, the second downlink control information message also indicating the feedback process identifier as being associated with the unicast downlink shared channel; and
transmit feedback pertaining to the multicast data message based at least in part on at least one of the multicast downlink shared channel or the unicast downlink shared channel and the feedback process identifier being associated with both the multicast data message and the retransmission of the multicast data message.

37. An apparatus for wireless communications at a base station, comprising:
a processor;
memory in communication with the processor; and
instructions stored in the memory, the instructions being executable by the processor to:
transmit, to a user equipment (UE), a first downlink control information message scheduling transmission of a multicast data message in a multicast downlink shared channel, the first downlink control information message also indicating a feedback process identifier associated with the multicast data message;
transmit a second downlink control information message scheduling a unicast downlink shared channel that includes a retransmission of the multicast data message, the second downlink control information message also indicating the feedback process identifier as being associated with the unicast downlink shared channel; and
receive feedback pertaining to the multicast data message based at least in part on at least one of the multicast downlink shared channel or the unicast downlink shared channel and the feedback process identifier being associated with both the multicast data message and the retransmission of the multicast data message.

* * * * *